US008833056B2

(12) United States Patent
Umemoto et al.

(10) Patent No.: US 8,833,056 B2
(45) Date of Patent: Sep. 16, 2014

(54) EXHAUST PURIFICATION SYSTEM OF INTERNAL COMBUSTION ENGINE

(75) Inventors: Kazuhiro Umemoto, Susono (JP); Kohei Yoshida, Gotenba (JP); Mikio Inoue, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/262,442

(22) PCT Filed: Sep. 2, 2010

(86) PCT No.: PCT/JP2010/065450
§ 371 (c)(1),
(2), (4) Date: Sep. 30, 2011

(87) PCT Pub. No.: WO2012/029190
PCT Pub. Date: Mar. 8, 2012

(65) Prior Publication Data
US 2013/0149198 A1 Jun. 13, 2013

(51) Int. Cl.
*F01N 3/00* (2006.01)
*F02D 41/02* (2006.01)
*F01N 3/20* (2006.01)
*F01N 3/08* (2006.01)
*F02D 41/40* (2006.01)
*B01D 53/94* (2006.01)

(52) U.S. Cl.
CPC .......... *B01D 53/9431* (2013.01); *F02D 41/024* (2013.01); *F01N 3/206* (2013.01); *F01N 3/0821* (2013.01); *Y02T 10/44* (2013.01); *F02D 41/405* (2013.01); *F01N 3/0842* (2013.01); *F02D 41/0275* (2013.01); *F01N 2610/03* (2013.01); *Y02T 10/26* (2013.01); *F01N 2240/30* (2013.01)

USPC .................................. 60/285; 60/286; 60/295

(58) Field of Classification Search
USPC ............................. 60/274–311; 422/108, 109
See application file for complete search history.

(56) References Cited

U.S. PATENT DOCUMENTS 7,082,753 B2 * 8/2006 Dalla Betta et al. ............ 60/286
7,322,340 B2 * 1/2008 Ohga et al. .................... 123/299
(Continued)

FOREIGN PATENT DOCUMENTS

EP 2 031 199 3/2009
JP A-2003-148132 5/2003
(Continued)

OTHER PUBLICATIONS

Dec. 21, 2010 Search Report issued in International Patent Application No. PCT/JP2010/065450.

*Primary Examiner* — Thomas Denion
*Assistant Examiner* — Kelsey Stanek
(74) *Attorney, Agent, or Firm* — Oliff PLC

(57) ABSTRACT

In an internal combustion engine, inside an engine exhaust passage, a hydrocarbon feed valve (15) and an exhaust purification catalyst (13) are arranged. A first hydrocarbon feed method which injections hydrocarbons from the hydrocarbon feed valve (15) by predetermined feed intervals ($\Delta T$) so that the air-fuel ratio of the exhaust gas falls to the demanded minimum air-fuel ratio (X) to thereby remove the $NO_x$ contained in the exhaust gas and a second hydrocarbon feed method which lowers the feed amount of hydrocarbons from the hydrocarbon feed valve (15) and feeds fuel to the combustion chambers (2) during a second half of the expansion stroke or the exhaust stroke are selectively used.

9 Claims, 23 Drawing Sheets

(56) References Cited

U.S. PATENT DOCUMENTS

| | | | |
|---|---|---|---|
| 7,332,135 B2 * | 2/2008 | Gandhi et al. | 422/177 |
| 7,703,275 B2 | 4/2010 | Asanuma et al. | |
| 7,788,910 B2 * | 9/2010 | McCabe et al. | 60/295 |
| 8,479,501 B2 * | 7/2013 | McCarthy, Jr. | 60/301 |
| 2004/0050037 A1 | 3/2004 | Betta et al. | |
| 2005/0124459 A1 * | 6/2005 | Ito | 477/43 |
| 2007/0125073 A1 | 6/2007 | Reuter | |
| 2009/0084091 A1 | 4/2009 | Tsujimoto et al. | |
| 2009/0266057 A1 | 10/2009 | Tsujimoto et al. | |
| 2010/0115923 A1 | 5/2010 | Tsujimoto et al. | |
| 2011/0052232 A1 | 3/2011 | Ohshima et al. | |

FOREIGN PATENT DOCUMENTS

| | | |
|---|---|---|
| JP | A-2004-301109 | 10/2004 |
| JP | A-2005-061340 | 3/2005 |
| JP | A-2007-514090 | 5/2007 |
| JP | B2-3969450 | 9/2007 |
| JP | A-2008-115838 | 5/2008 |
| JP | A-2008-232003 | 10/2008 |
| JP | A-2008-267217 | 11/2008 |
| JP | A-2008-286186 | 11/2008 |

* cited by examiner

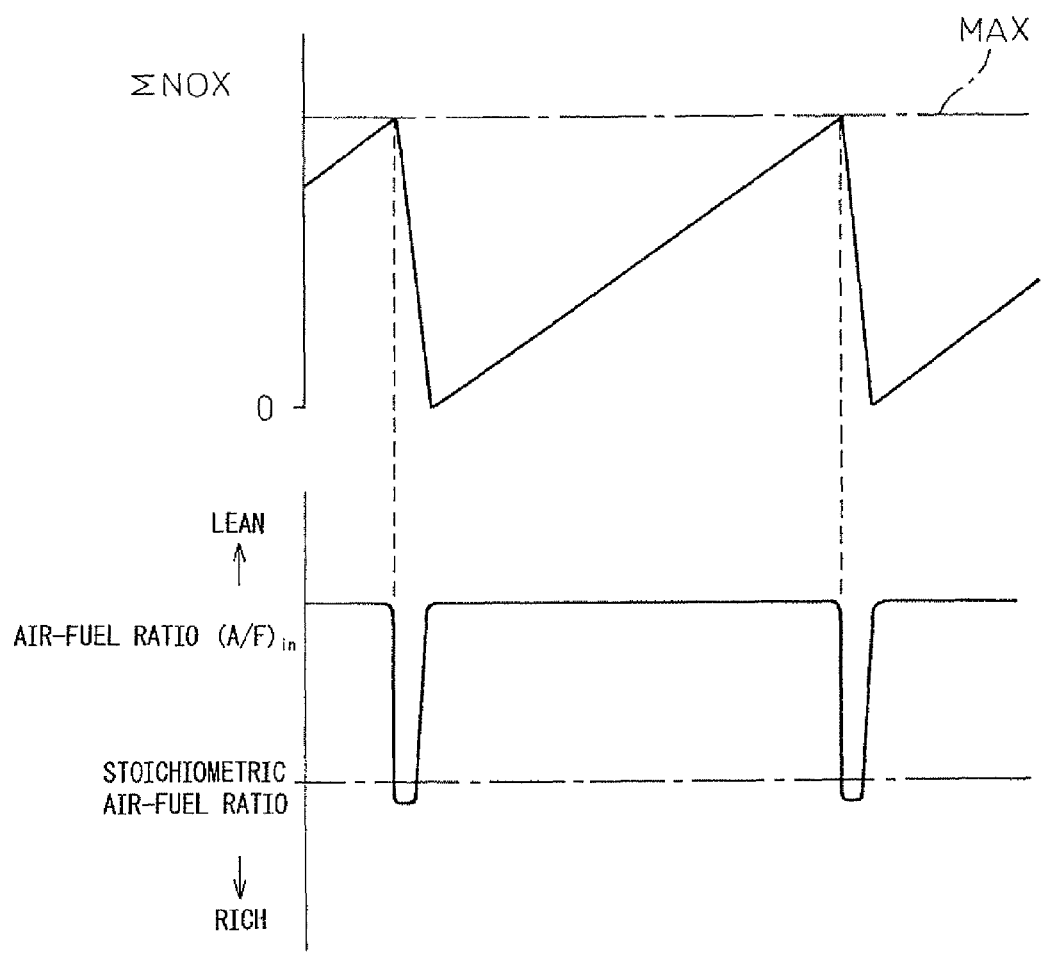

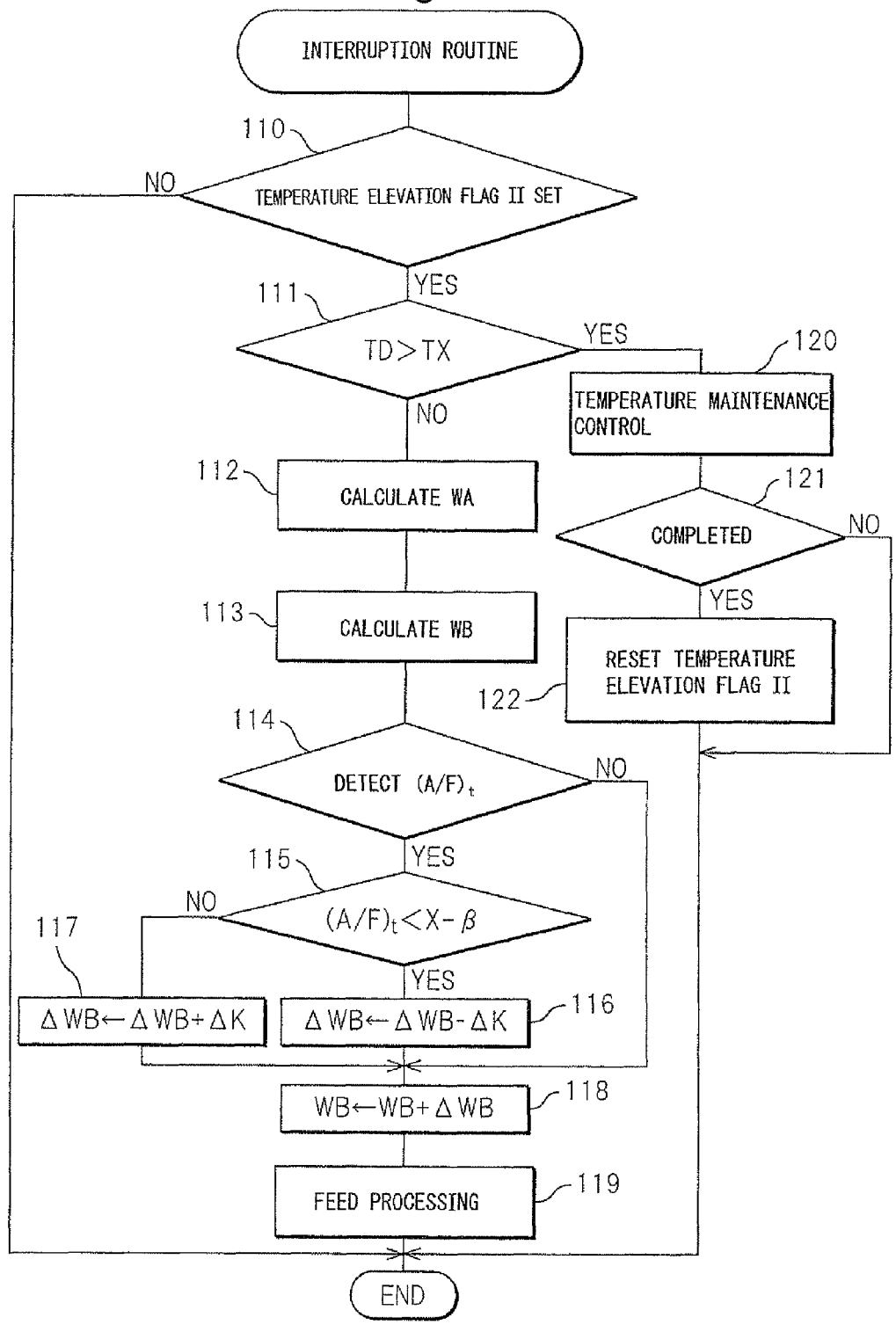

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges, in an engine exhaust passage, an $NO_x$ storage catalyst which stores $NO_x$ which is contained in exhaust gas when the air-fuel ratio of the inflowing exhaust gas is lean and which releases the stored $NO_x$ when the air-fuel ratio of the inflowing exhaust gas becomes rich, which arranges, in the engine exhaust passage upstream of the $NO_x$ storage catalyst, an oxidation catalyst which has an adsorption function, and which feeds hydrocarbons into the engine exhaust passage upstream of the oxidation catalyst to make the air-fuel ratio of the exhaust gas flowing into the $NO_x$ storage catalyst rich when releasing $NO_x$ from the $NO_x$ storage catalyst (for example, see Patent Literature 1).

In this internal combustion engine, the hydrocarbons which are fed when releasing $NO_x$ from the $NO_x$ storage catalyst are made gaseous hydrocarbons at the oxidation catalyst, and the gaseous hydrocarbons are fed to the $NO_x$ storage catalyst. As a result, the $NO_x$ which is released from the $NO_x$ storage catalyst is reduced well.

CITATION LIST

Patent Literature

Patent Literature 1: Japanese Patent No. 3969450

SUMMARY OF INVENTION

Technical Problem

However, there is the problem that when the $NO_x$ storage catalyst becomes a high temperature, the $NO_x$ purification rate falls.

An object of the present invention is to provide an exhaust purification system of an internal combustion engine which selectively uses two types of hydrocarbon feed methods and enables a high $NO_x$ purification rate to be obtained even if the temperature of the exhaust purification catalyst becomes a high temperature.

Solution to Problem

According to the present invention, there is provided an exhaust purification system of an internal combustion engine wherein a hydrocarbon feed valve for feeding hydrocarbons is arranged inside an engine exhaust passage, an exhaust purification catalyst for causing a reaction between hydrocarbons injected from the hydrocarbon feed valve and $NO_x$ contained in exhaust gas is arranged in the engine exhaust passage downstream of the hydrocarbon feed valve, a precious metal catalyst is carried on an exhaust gas flow surface of the exhaust purification catalyst and a basic exhaust gas flow surface part is formed around the precious metal catalyst, the exhaust purification catalyst has a property of reducing the $NO_x$ which is contained in exhaust gas if hydrocarbons are injected from the hydrocarbon feed valve at predetermined intervals so that an air-fuel ratio of the exhaust gas falls to a predetermined air-fuel ratio and has a property of being increased in storage amount of $NO_x$ which is contained in exhaust gas when the feed intervals of the hydrocarbons are made longer than the predetermined feed intervals, and, at the time of engine operation, a first hydrocarbon feed method which injects hydrocarbons from the hydrocarbon feed valve by the above-mentioned predetermined feed intervals so that the air-fuel ratio of the exhaust gas falls to the above-mentioned predetermined air-fuel ratio and thereby removes the $NO_x$ contained in the exhaust gas and a second hydrocarbon feed method which lowers a feed amount of hydrocarbons from the hydrocarbon feed valve and feeds a fuel required for lowering the air-fuel ratio of the exhaust gas to the above predetermined air-fuel ratio into a combustion chambers during a second half of an expansion stroke or an exhaust stroke are selectively used.

Advantageous Effects of Invention

It is possible to selectively use a first hydrocarbon feed method and second hydrocarbon feed method and obtain a high $NO_x$ purification rate even if the temperature of the exhaust purification catalyst becomes a high temperature.

BRIEF DESCRIPTION OF DRAWINGS

FIG. 17 is a view showing changes in the air-fuel ratio of the exhaust gas flowing to the exhaust purification catalyst etc.

FIG. 31 is a flow chart showing an interruption routine.

DESCRIPTION OF EMBODIMENTS

Figure 1:
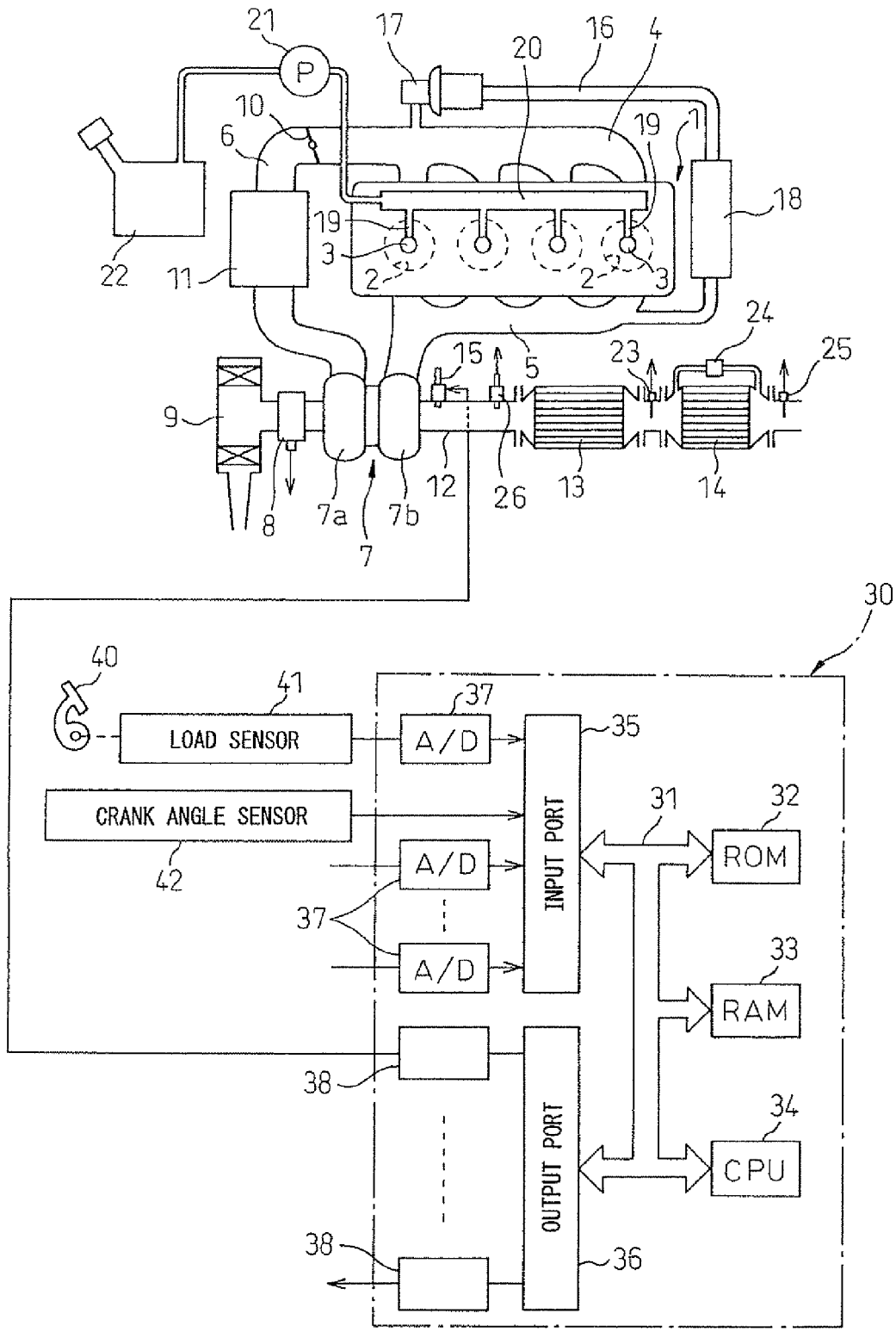
FIG. 1 is an overall view of a compression ignition type internal combustion engine.

FIG. 1 is an overall view of a compression ignition type internal combustion engine.

Referring to FIG. 1, 1 indicates an engine body, 2a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. The outlet of the exhaust turbine 7b is connected through an exhaust pipe 12 to an inlet of the exhaust purification catalyst 13, while the outlet of the exhaust purification catalyst 13 is connected to a particulate filter 14 for trapping particulate which is contained in the exhaust gas. Inside the exhaust pipe 12 upstream of the exhaust purification catalyst 13, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, a electronically controlled EGR control valve 17 is arranged. Further, around the EGR passage 16, a cooling device 18 is arranged for cooling EGR gas flowing through the inside of the EGR passage 16. In the embodiment shown in FIG. 1, the engine cooling water is guided to the inside of the cooling device 18 where the engine cooling water is used to cool the EGR gas. On the other hand, each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 20 is fed through each fuel feed tube 19 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust purification catalyst 13, a temperature sensor 23 is attached for detecting the temperature of the exhaust purification catalyst 13. At the particulate filter 14, a differential pressure sensor 24 is attached for detecting the differential pressure before and after the particulate filter 14. Further, downstream of the particulate filter 14, a temperature sensor 25 is arranged for detecting the temperature of the particulate filter 14. Further, downstream of the hydrocarbon feed valve 15 inside the exhaust pipe 12, an air-fuel ratio sensor 26 is arranged. The output signals of these temperature sensors 23 and 25, differential pressure sensor 24, air-fuel ratio sensor 26, and intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, step motor for driving the throttle valve 10, hydrocarbon feed valve 15, EGR control valve 17, and fuel pump 21.

Figure 2:
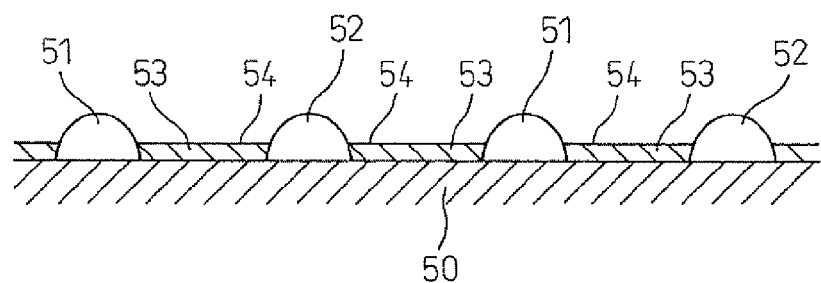
FIG. 2 is a view schematically showing a surface part of a catalyst carrier.

FIG. 2 schematically shows a surface part of a catalyst carrier which is carried on a substrate of the exhaust purification catalyst 13. At this exhaust purification catalyst 13, as shown in FIG. 2, for example, there is provided a catalyst carrier 50 made of alumina on which precious metal catalysts 51 and 52 are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal able to donate electrons to $NO_x$. The exhaust gas flows along the top of the catalyst carrier 50, so the precious metal catalysts 51 and 52 can be said to be carried on the exhaust gas flow surface of the exhaust purification catalyst 13. Further, the surface of the basic layer 53 exhibits basicity, so the surface of the basic layer 53 is called the basic exhaust gas flow surface part 54.

On the other hand, in FIG. 2, the precious metal catalyst 51 is comprised of platinum Pt, while the precious metal catalyst 52 is comprised of rhodium Rh. That is, the precious metal catalysts 51 and 52 which are carried on the catalyst carrier 50 are comprised of platinum Pt and rhodium Rh. Note that, on the catalyst carrier 50 of the exhaust purification catalyst 13, in addition to platinum Pt and rhodium Rh, palladium Pd may be further carried or, instead of rhodium Rh, palladium Pd may be carried. That is, the precious metal catalysts 51 and 52 which are carried on the catalyst carrier 50 are comprised of platinum Pt and at least one of rhodium Rh and palladium Pd.

Figure 3:
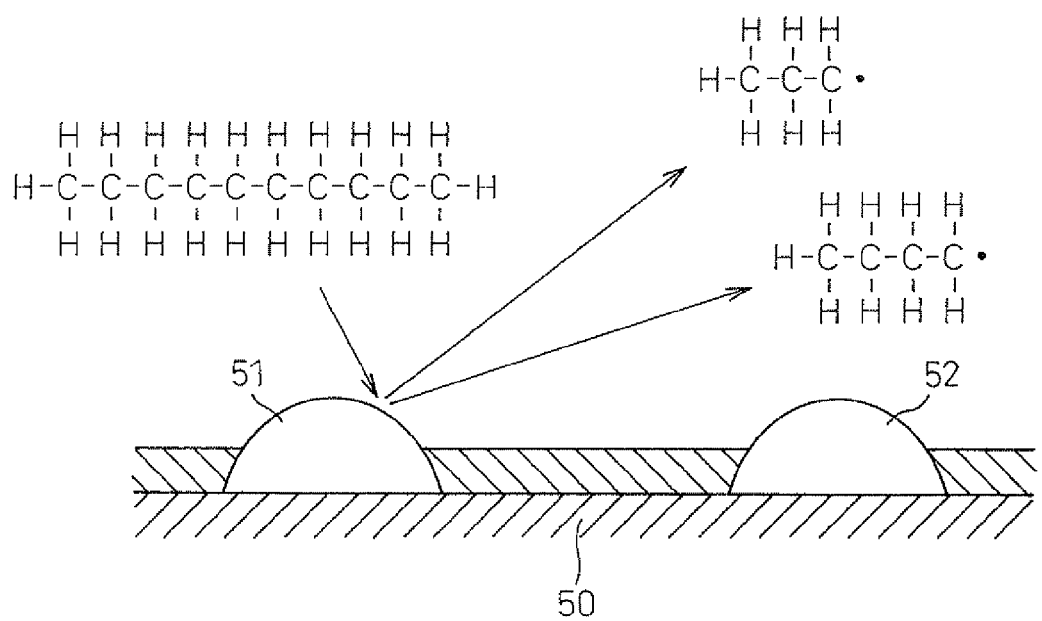
FIG. 3 is a view for explaining an oxidation reaction in an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_x$ at the exhaust purification catalyst 13. FIG. 3 schematically shows the reforming action performed at the exhaust purification catalyst 13 at this time. As shown in FIG. 3, the hydrocarbons HC which are injected from the hydrocarbon feed valve 15 become radical hydrocarbons HC with a small carbon number by the catalyst 51.

Figure 4:
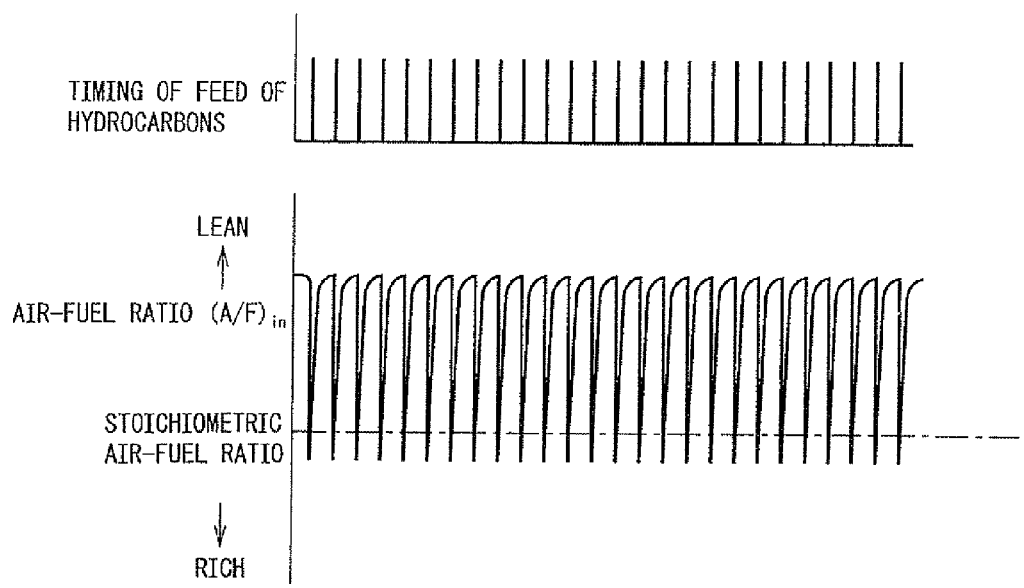
FIG. 4 is a view showing a change of an air-fuel ratio of exhaust gas flowing into an exhaust purification catalyst.

FIG. 4 shows the timing of feed of hydrocarbons from the hydrocarbon feed valve 15 and the changes in the air-fuel ratio (A/F)in of the exhaust gas flowing into the exhaust purification catalyst 13. Note that, the changes in the air-fuel ratio (A/F)in depend on the change in concentration of the hydrocarbons in the exhaust gas which flows into the exhaust purification catalyst 13, so it can be said that the change in the air-fuel ratio (A/F)in shown in FIG. 4 expresses the change in concentration of the hydrocarbons. However, if the hydrocarbon concentration becomes higher, the air-fuel ratio (A/F)in becomes smaller, so, in FIG. 4, the more to the rich side the air-fuel ratio (A/F)in becomes, the higher the hydrocarbon concentration.

Figure 5:
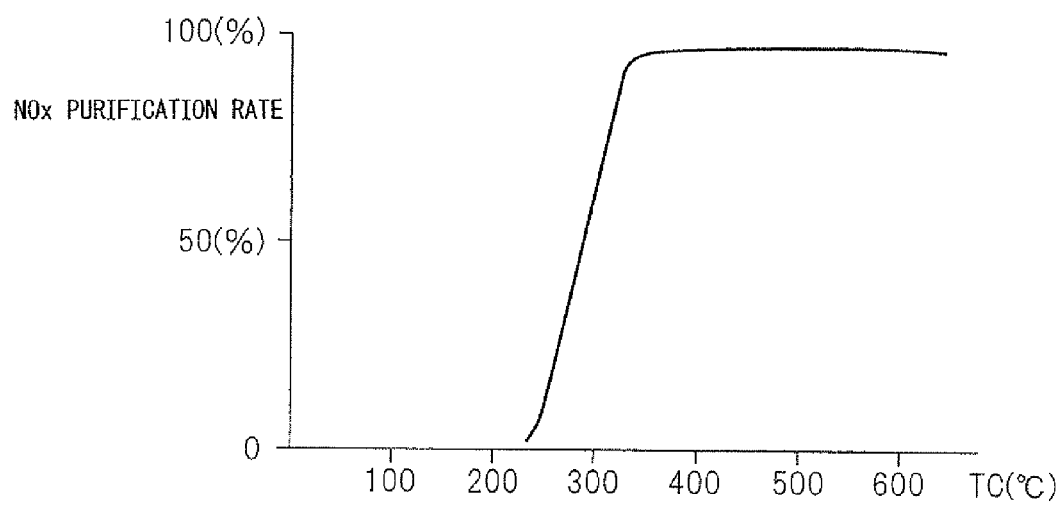
FIG. 5 is a view showing an $NO_x$ purification rate.

FIG. 5 shows the $NO_x$ purification rate by the exhaust purification catalyst 13 with respect to the catalyst temperature TC of the exhaust purification catalyst 13 when periodically feeding hydrocarbons from the hydrocarbon feed valve 15, that is, periodically changing the concentration of hydrocarbons flowing into the exhaust purification catalyst 13, so as to change the air-fuel ratio (A/F)in of the exhaust gas flowing into the exhaust purification catalyst 13 as shown in FIG. 4. The inventors engaged in research relating to $NO_x$ purification for a long time. In the process of research, they learned that if making the concentration of hydrocarbons flowing into the exhaust purification catalyst 13 vibrate by within a predetermined range of amplitude and within a predetermined range of period, that is, if injecting hydrocarbons from the hydrocarbon feed valve 15 at predetermined feed intervals so that the air-fuel ratio of the exhaust gas falls to a predetermined air-fuel ratio, as shown in FIG. 5, an extremely high $NO_x$ purification rate is obtained even in a 400° C. or higher high temperature region.

Figure 6A:
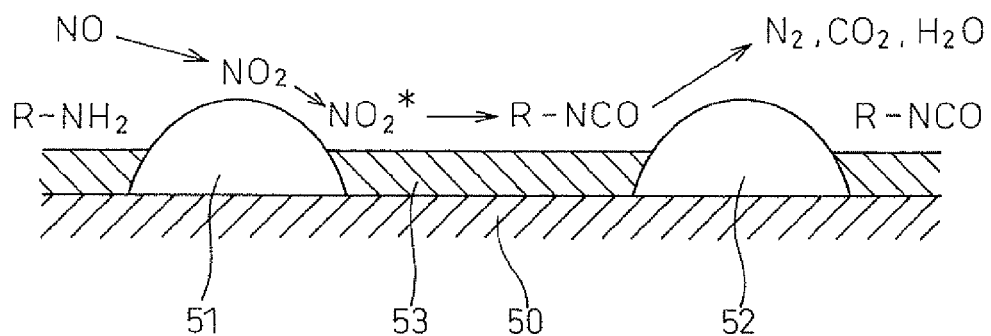
FIGS. 6A and 6B are views for explaining an oxidation reduction reaction in an exhaust purification catalyst.
Figure 6B:
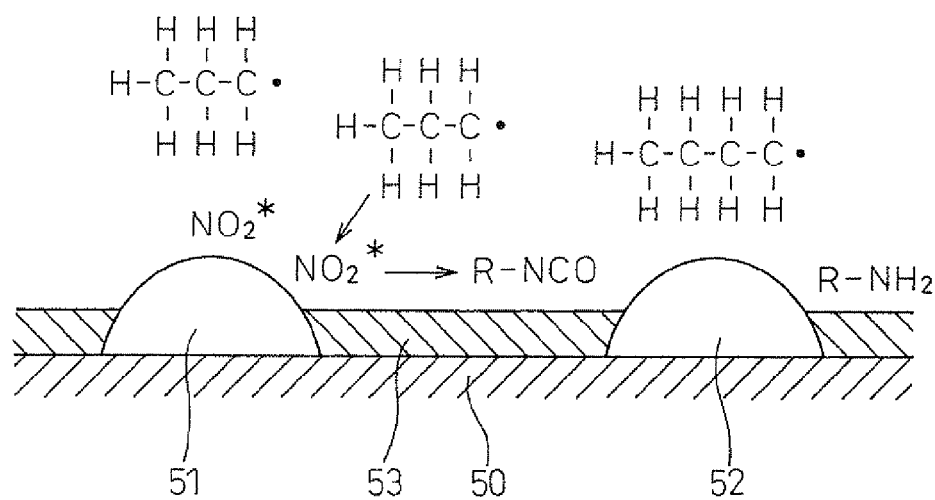

Furthermore, at this time, a large amount of reducing intermediate containing nitrogen and hydrocarbons continues to be held or adsorbed on the surface of the basic layer 53, that is, on the basic exhaust gas flow surface part 54 of the exhaust purification catalyst 13. It is learned that this reducing intermediate plays a central role in obtaining a high $NO_x$ purification rate. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction guessed to occur when the concentration of hydrocarbons flowing into the exhaust purification catalyst 13 is made to vibrate within a predetermined range of amplitude and within a predetermined range of period, that is, when injecting hydrocarbons from the hydrocarbon feed valve 15 at predetermined feed intervals so that the air-fuel ratio of the exhaust gas falls to a predetermined air-fuel ratio.

FIG. 6A shows when the concentration of hydrocarbons flowing into the exhaust purification catalyst 13 is low, while FIG. 6B shows when hydrocarbons are fed from the hydrocarbon feed valve 15 and the concentration of hydrocarbons flowing into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. Therefore, the $NO_x$ which is contained in the exhaust gas, as shown in FIG. 6A, is oxidized on the platinum 51 and becomes $NO_2$. Next, this $NO_2$ is supplied with electrons from the platinum 51 and becomes $NO_2^-$. Therefore, a large amount of $NO_2^-$ is produced on the platinum 51. This $NO_2^-$ is strong in activity. Above, this $NO_2^-$ is called the active $NO_2^*$.

On the other hand, if hydrocarbons are fed from the hydrocarbon feed valve 15, as shown in FIG. 3, the hydrocarbons are reformed and become radicalized inside of the exhaust purification catalyst 13. As a result, as shown in FIG. 6B, the hydrocarbon concentration around the active $NO_2^*$ becomes higher. In this regard, after the active $NO_2^*$ is produced, if the state of a high oxygen concentration around the active $NO_2^*$ continues for a predetermined time or more, the active $NO_2^*$ is oxidized and is absorbed in the basic layer 53 in the form of nitrate ions $NO_3^-$. However, if the hydrocarbon concentration around the active $NO_2^*$ is made higher before this predetermined time passes, as shown in FIG. 6B, the active $NO_2^*$ reacts on the platinum 51 with the radical hydrocarbons HC whereby a reducing intermediate is produced. This reducing intermediate is adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This nitro compound R—$NO_2$, when hydrolyzed, becomes an amine compound R—$NH_2$. However, in this case, what is hydrolyzed is considered to be part of the isocyanate compound R—NCO. Therefore, as shown in FIG. 6B, the majority of the reducing intermediate which is held or adsorbed on the surface of the basic layer 53 is believed to be the isocyanate compound R—NCO and amine compound R—$NH_2$.

On the other hand, as shown in FIG. 6B, if the produced reducing intermediate is surrounded by the hydrocarbons HC, the reducing intermediate is blocked by the hydrocarbons HC and the reaction will not proceed any further. In this case, if the concentration of hydrocarbons flowing into the exhaust purification catalyst 13 is lowered and thereby the oxygen concentration becomes higher, the hydrocarbons around the reducing intermediate will be oxidized. As a result, as shown in FIG. 6A, the reducing intermediate and the active $NO_2^*$ will react. At this time, the active $NO_2^*$ reacts with the reducing intermediate R—NCO or R—$NH_2$ to form $N_2$, $CO_2$, and $H_2O$ and consequently the $NO_x$ is removed.

In this way, in the exhaust purification catalyst 13, by making the concentration of hydrocarbons flowing into the exhaust purification catalyst 13 higher, a reducing intermediate is produced. By making the concentration of hydrocarbons flowing into the exhaust purification catalyst 13 lower and raising the oxygen concentration, the active $NO_2^*$ reacts with the reducing intermediate and the $NO_x$ is removed. That is, in order for the exhaust purification catalyst 13 to remove the $NO_x$, the concentration of hydrocarbons flowing into the exhaust purification catalyst 13 has to be periodically changed.

Of course, in this case, it is necessary to raise the concentration of hydrocarbons to a concentration sufficiently high for producing the reducing intermediate and it is necessary to lower the concentration of hydrocarbons to a concentration sufficiently low for making the produced reducing intermediate react with the active $NO_2^*$. That is, the concentration of hydrocarbons flowing into the exhaust purification catalyst 13 has to be made to vibrate within a predetermined range of amplitude. Note that, in this case, a sufficient amount of reducing intermediate R—NCO or R—$NH_2$ has to be held on the basic layer 53, that is, on the basic exhaust gas flow surface part 24, until the produced reducing intermediate reacts with the active $NO_2^*$. For this reason, the basic exhaust gas flow surface part 24 is provided.

On the other hand, if lengthening the feed period of the hydrocarbons, the time in which the oxygen concentration becomes higher becomes longer in the period after the hydrocarbons are fed until the hydrocarbons are next fed. Therefore, the active $NO_2^*$ is absorbed in the basic layer 53 in the form of nitrates without producing a reducing intermediate. To avoid this, it is necessary to make the concentration of hydrocarbons flowing into the exhaust purification catalyst 13 vibrate by within a predetermined range of period.

Therefore, in an embodiment of the present invention, to make the $NO_x$ contained in the exhaust gas and the reformed hydrocarbons react and produce the reducing intermediate R—NCO or R—$NH_2$ containing nitrogen and hydrocarbons, precious metal catalysts 51 and 52 are carried on the exhaust gas flow surface of the exhaust purification catalyst 13. To hold the produced reducing intermediate R—NCO or R—$NH_2$ inside the exhaust purification catalyst 13, a basic exhaust gas flow surface part 54 is formed around the precious metal catalysts 51 and 52. To hold the produced reducing intermediate R—NCO or R—$NH_2$ inside the exhaust purification catalyst 13, a basic exhaust gas flow surface part 54 is formed around the precious metal catalysts 51 and 52. $NO_x$ is reduced by the reducing action of the reducing intermediate R—NCO or R—$NH_2$ held on the basic exhaust gas flow surface part 54, and the vibration period of the hydrocarbon concentration, that is, the feed period of the hydrocarbons from the hydrocarbon feed valve 15, is made the period required for ensuring the continued presence of the reducing intermediate R—NCO or R—$NH_2$. Incidentally, in the example shown in FIG. 4, the injection interval is made 3 seconds.

Figure 7A:
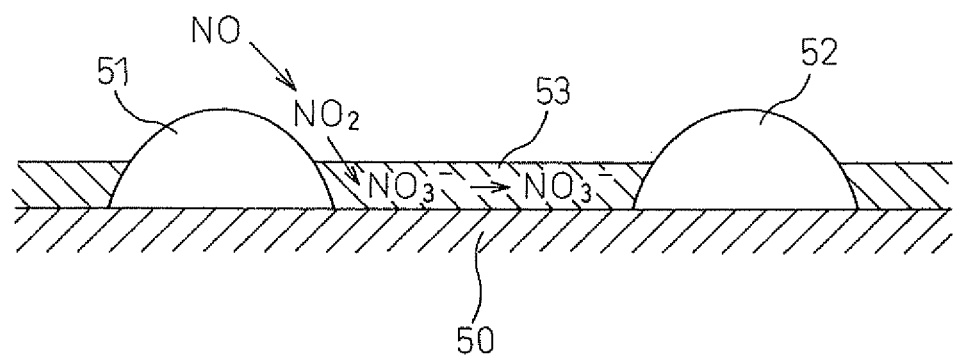
FIGS. 7A and 7B are views for explaining an oxidation reduction reaction in an exhaust purification catalyst.

If the vibration period of the hydrocarbon concentration, that is, the feed period of the hydrocarbons HC, is made longer than the above predetermined range of period, the reducing intermediate R—NCO or R—$NH_2$ disappears from the surface of the basic layer 53. At this time, the active $NO_2^*$ which is produced on the platinum Pt 53, as shown in FIG. 7A, diffuses in the basic layer 53 in the form of nitrate ions $NO_3^-$ and becomes nitrates. That is, at this time, the $NO_x$ in the exhaust gas is absorbed in the form of nitrates inside of the basic layer 53.

Figure 7B:
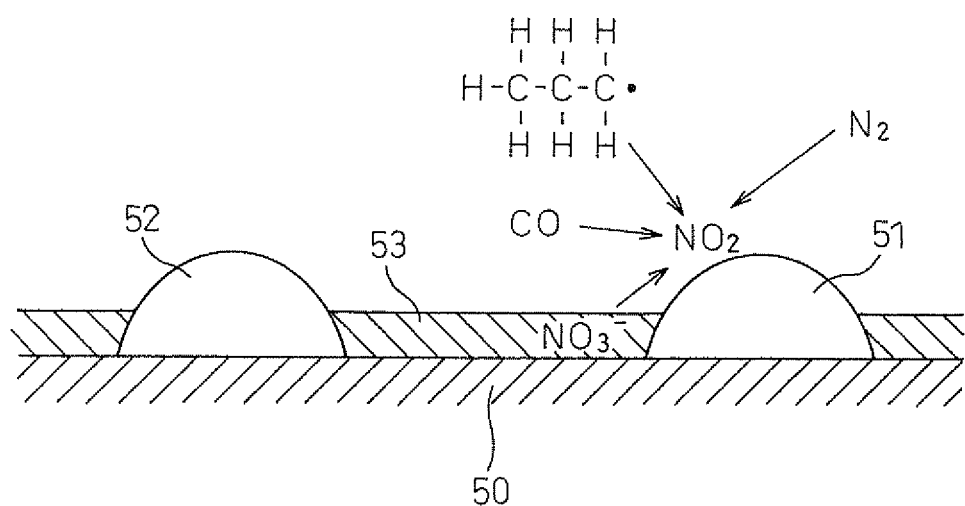

On the other hand, FIG. 7B shows the case where the air-fuel ratio of the exhaust gas which flows into the exhaust purification catalyst 13 is made the stoichiometric air-fuel ratio or rich when the $NO_x$ is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 become nitrate ions $NO_3^-$ one by one and, as shown in FIG. 7B, are released from the basic layer 53 in the form of $NO_2$. Next, the released $NO_2$ is reduced by the hydrocarbons HC and CO contained in the exhaust gas.

Figure 8:
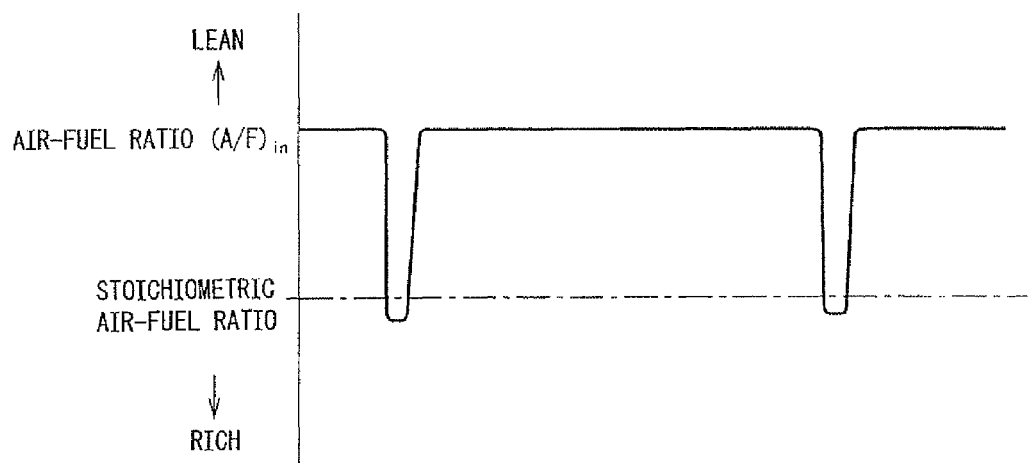
FIG. 8 is a view showing a change of an air-fuel ratio of exhaust gas flowing into an exhaust purification catalyst.

FIG. 8 shows the case of making the air-fuel ratio (A/F)in of the exhaust gas which flows into the exhaust purification catalyst 13 temporarily rich slightly before the $NO_x$ absorption ability of the basic layer 53 becomes saturated. Note that, in the example shown in FIG. 8, the time interval of this rich control is 1 minute or more. In this case, the $NO_x$ which was absorbed in the basic layer 53 when the air-fuel ratio (A/F)in of the exhaust gas was lean is released all at once from the basic layer 53 and reduced when the air-fuel ratio (A/F)in of the exhaust gas is made temporarily rich. Therefore, in this case, the basic layer 53 plays the role of an absorbent for temporarily absorbing $NO_x$.

Note that, at this time, sometimes the basic layer 53 temporarily adsorbs the $NO_x$. Therefore, if using term of storage as a term including both absorption and adsorption, at this time, the basic layer 53 performs the role of an $NO_x$ storage agent for temporarily storing the $NO_x$. That is, in this case, if the ratio of the air and fuel (hydrocarbons) which are supplied into the engine intake passage, combustion chambers 2, and exhaust passage upstream of the exhaust purification catalyst 13 is referred to as the air-fuel ratio of the exhaust gas, the exhaust purification catalyst 13 functions as an $NO_x$ storage catalyst which stores the $NO_x$ when the air-fuel ratio of the exhaust gas is lean and releases the stored $NO_x$ when the oxygen concentration in the exhaust gas falls.

Figure 9:
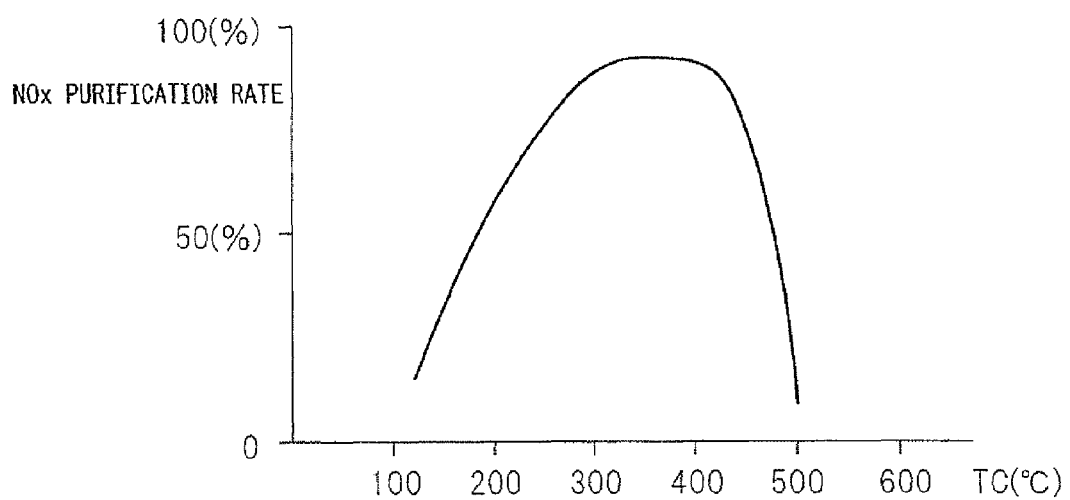
FIG. 9 is a view of an $NO_x$ purification rate.

FIG. 9 shows the $NO_x$ purification rate when making the exhaust purification catalyst 13 function as an $NO_x$ storage catalyst in this way. Note that, the abscissa of the FIG. 9 shows the catalyst temperature TC of the exhaust purification catalyst 13. When making the exhaust purification catalyst 13 function as an $NO_x$ storage catalyst, as shown in FIG. 9, when the catalyst temperature TC is 300° C. to 400° C., an extremely high $NO_x$ purification rate is obtained, but when the catalyst temperature TC becomes a 400° C. or higher high temperature, the $NO_x$ purification rate falls.

In this way, when the catalyst temperature TC becomes 400° C. or more, the $NO_x$ purification rate falls because if the catalyst temperature TC becomes 400° C. or more, the nitrates break down by heat and are released in the form of $NO_2$ from the exhaust purification catalyst 13. That is, so long as storing $NO_x$ in the form of nitrates, when the catalyst temperature TC is high, it is difficult to obtain a high $NO_x$ purification rate. However, in the new $NO_x$ purification method shown from FIG. 4 to FIGS. 6A and 6B, as will be understood from FIGS. 6A and 6B, nitrates are not formed or even if formed are extremely fine in amount, consequently, as shown in FIG. 5, even when the catalyst temperature TC is high, a high $NO_x$ purification rate is obtained.

Therefore, in the present invention, a hydrocarbon feed valve 15 is arranged inside of the engine exhaust passage for feeding hydrocarbons, an exhaust purification catalyst 13 is arranged downstream of the hydrocarbon feed valve 15 inside of the engine exhaust passage for causing the hydrocarbons injected from the hydrocarbon feed valve 15 and the $NO_x$ contained in the exhaust gas to react, precious metal catalysts 51 and 52 are carried on the exhaust gas flow surface of the exhaust purification catalyst 13, a basic exhaust gas flow surface part 54 is formed, around the precious metal catalysts 51 and 52, the exhaust purification catalyst 13 has the property of reducing the $NO_x$ which is contained in the exhaust gas if hydrocarbons are injected at predetermined feed intervals from the hydrocarbon feed valve 15 so that the air-fuel ratio of the exhaust gas falls to the predetermined air-fuel ratio and has the property of being increased in storage amount of $NO_x$ which is contained in the exhaust gas if the feed intervals of hydrocarbons is made longer than the predetermined feed intervals, and, at the time of engine operation, hydrocarbons are injected from the hydrocarbon feed valve 15 by the above predetermined feed intervals so that the air-fuel ratio of the exhaust gas falls to the above-mentioned predetermined air-fuel ratio. Due to this, the $NO_x$ which is contained in the exhaust gas is reduced in the exhaust purification catalyst 13.

That is, the $NO_x$ purification method which is shown from FIG. 4 to FIGS. 6A and 6B can be said to be a new $NO_x$ purification method designed to remove $NO_x$ without forming almost any nitrates in the case of using an exhaust purification catalyst which carries a precious metal catalyst and forms a basic layer which can absorb $NO_x$. In actuality, when using this new $NO_x$ purification method, the nitrates which are detected from the basic layer 53 become much smaller in amount compared with the case where making the exhaust purification catalyst 13 function as an $NO_x$ storage catalyst. Note that, this new $NO_x$ purification method will be referred to below as the first $NO_x$ purification method.

Next, referring to FIG. 10 to FIG. 15, this first $NO_x$ purification method will be explained in a little more detail.

Figure 10:
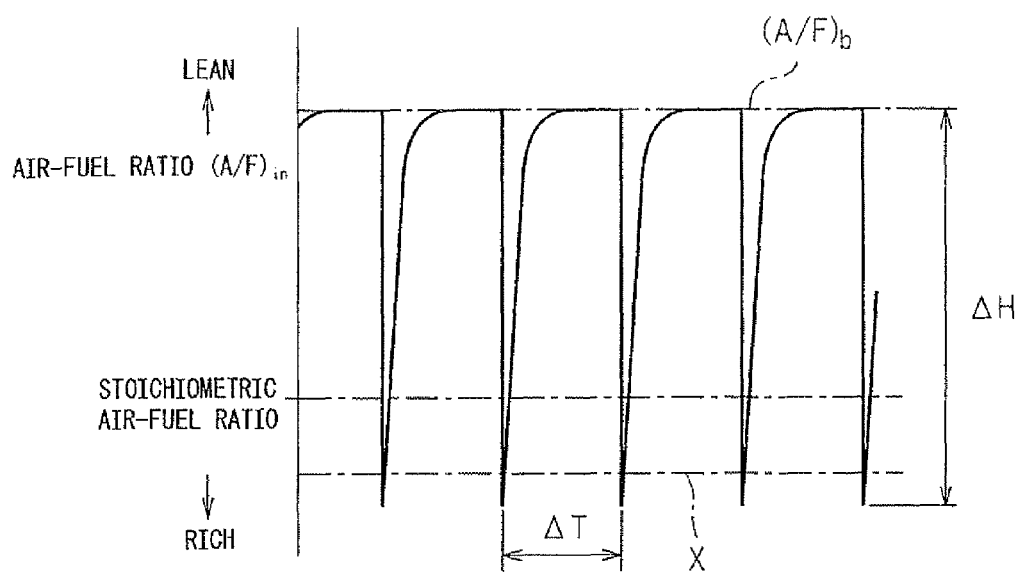
FIG. 10 is a time chart showing a change of an air-fuel ratio of exhaust gas flowing into an exhaust purification catalyst.

FIG. 10 shows enlarged the change in the air-fuel ratio (A/F)in shown in FIG. 4. Note that, as explained above, the change in the air-fuel ratio (A/F)in of the exhaust gas flowing into this exhaust purification catalyst 13 simultaneously shows the change in concentration of the hydrocarbons which flow into the exhaust purification catalyst 13. Note that, in FIG. 10, $\Delta H$ shows the amplitude of the air-fuel ratio (A/F)in, that is, the amplitude of the changes in concentration of hydrocarbons HC flowing into the exhaust purification catalyst 13, while $\Delta T$ shows the vibration period of the concentration of the hydrocarbons flowing into the exhaust purification catalyst 13, that is, the feed period of the hydrocarbons.

Furthermore, in FIG. 10, (A/F)b shows the base air-fuel ratio which shows the air-fuel ratio of the combustion gas for generating the engine output. In other words, this base air-fuel ratio (A/F)b shows the air-fuel ratio of the exhaust gas which flows into the exhaust purification catalyst 13 when stopping the feed of hydrocarbons. On the other hand, in FIG. 10, X shows the upper limit of the air-fuel ratio (A/F)in which is used for producing the reducing intermediate without the produced active $NO_2^*$ being stored in the form of nitrates inside the basic layer 53. To make the active $NO_2^*$ and the reformed hydrocarbons react and produce the reducing intermediate, it is necessary to make the air-fuel ratio (A/F)in lower than the upper limit X of this air-fuel ratio. The upper limit X of the air-fuel ratio required for producing this reducing intermediate will be referred to below as the demanded minimum air-fuel ratio.

In the example shown in FIG. 10, the demanded minimum air-fuel ratio X is rich, therefore, in this case, to form the reducing intermediate, the air-fuel ratio (A/F)in is instantaneously made the demanded minimum air-fuel ratio X or less, that is, rich. As opposed to this, in the example shown in FIG. 11, the demanded minimum air-fuel ratio X is lean. In this case, the air-fuel ratio (A/F)in is maintained lean while periodically reducing the air-fuel ratio (A/F)in so as to form the reducing intermediate.

In this case, whether the demanded minimum air-fuel ratio X becomes rich or becomes lean depends on the oxidizing strength of the exhaust purification catalyst 13. In this case, the exhaust purification catalyst 13, for example, becomes stronger in oxidizing strength if increasing the carried amount of the precious metal 51 and becomes stronger in oxidizing strength if strengthening the acidity. Therefore, the oxidizing strength of the exhaust purification catalyst 13 changes due to the carried amount of the precious metal 51 or the strength of the acidity.

Figure 11:
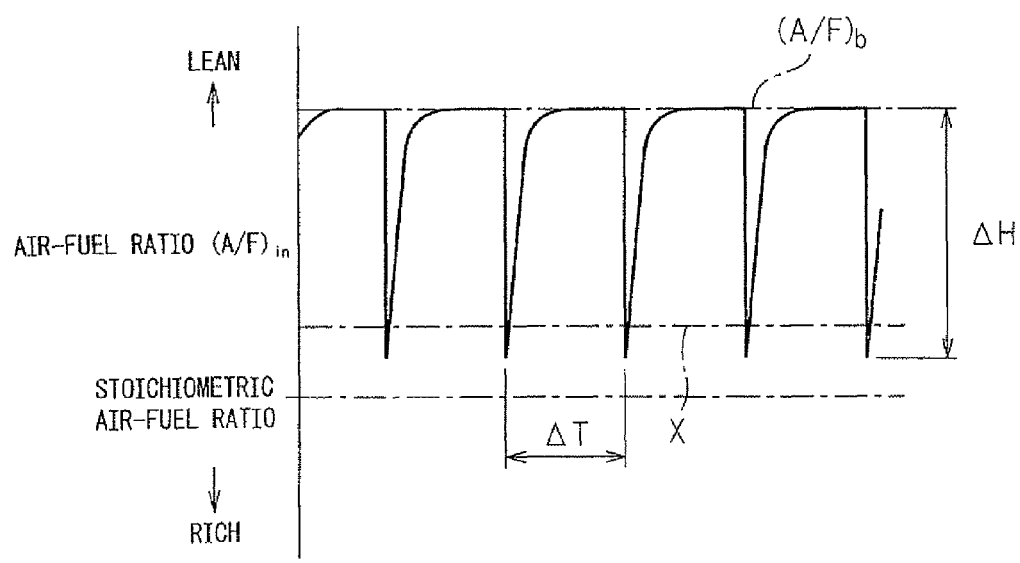
FIG. 11 is a time chart showing a change of an air-fuel ratio of exhaust gas flowing into an exhaust purification catalyst.

Now, if using an exhaust purification catalyst 13 with a strong oxidizing strength, as shown in FIG. 11, if maintaining the air-fuel ratio (A/F)in lean while periodically lowering the air-fuel ratio (A/F)in, the hydrocarbons end up becoming completely oxidized when the air-fuel ratio (A/F)in is reduced. As a result, the reducing intermediate can no longer be produced. As opposed to this, when using an exhaust purification catalyst 13 with a strong oxidizing strength, as shown in FIG. 10, if making the air-fuel ratio (A/F)in periodically rich, when the air-fuel ratio (A/F)in is made rich, the hydrocarbons will be partially oxidized, without being completely oxidized, that is, the hydrocarbons will be reformed, consequently the reducing intermediate will be produced. Therefore, when using an exhaust purification catalyst 13 with a strong oxidizing strength, the demanded minimum air-fuel ratio X has to be made rich.

On the other hand, when using an exhaust purification catalyst 13 with a weak oxidizing strength, as shown in FIG. 11, if maintaining the air-fuel ratio (A/F)in lean while periodically lowering the air-fuel ratio (A/F)in, the hydrocarbons will be partially oxidized without being completely oxidized, that is, the hydrocarbons will be reformed and consequently the reducing intermediate will be produced. As opposed to this, when using an exhaust purification catalyst 13 with a weak oxidizing strength, as shown in FIG. 10, if making the air-fuel ratio (A/F)in periodically rich, a large amount of hydrocarbons will be exhausted from the exhaust purification catalyst 13 without being oxidized and consequently the amount of hydrocarbons which is wastefully consumed will increase. Therefore, when using an exhaust purification catalyst 13 with a weak oxidizing strength, the demanded minimum air-fuel ratio X has to be made lean.

Figure 12:
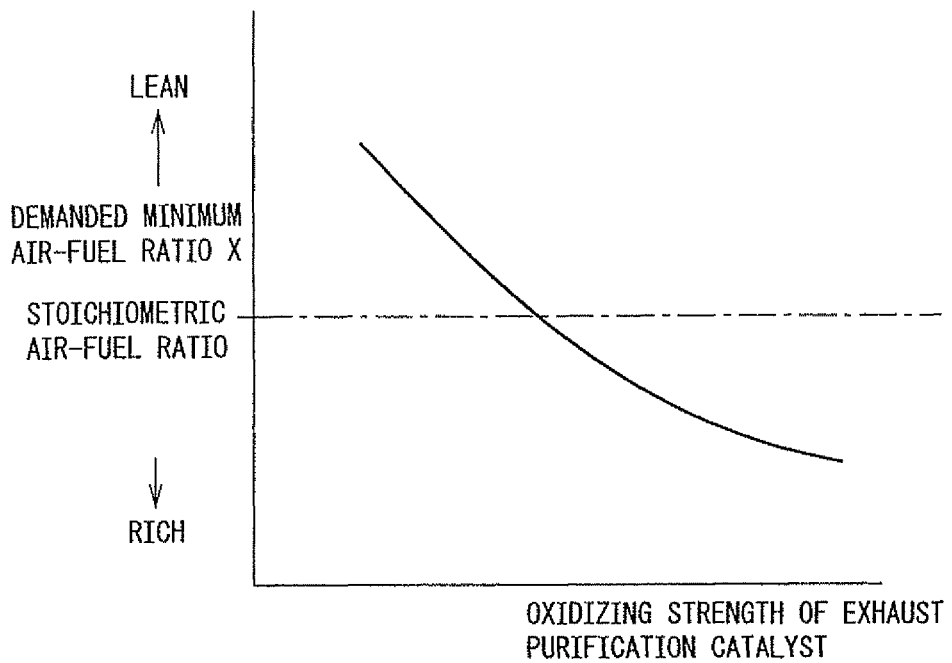
FIG. 12 is a view showing a relationship between an oxidizing strength of an exhaust purification catalyst and a demanded minimum air-fuel ratio X.

That is, it is learned that the demanded minimum air-fuel ratio X, as shown in FIG. 12, has to be reduced the stronger the oxidizing strength of the exhaust purification catalyst 13. In this way the demanded minimum air-fuel ratio X becomes lean or rich due to the oxidizing strength of the exhaust purification catalyst 13. Below, taking as an example the case where the demanded minimum air-fuel ratio X is rich, the amplitude $\Delta T$ of the air-fuel ratio (A/F)in, that is, the amplitude $\Delta T$ of the change in the concentration of hydrocarbons flowing into the exhaust purification catalyst 13 or the vibration period $\Delta T$ of the concentration of the hydrocarbons flowing into the exhaust purification catalyst 13, that is, the feed period $\Delta T$ of the hydrocarbons, will be explained.

Now, if the base air-fuel ratio (A/F)b becomes larger, that is, if the oxygen concentration in the exhaust gas before the hydrocarbons are fed becomes higher, the feed amount of hydrocarbons required for making the air-fuel ratio (A/F)in the demanded minimum air-fuel ratio X or less increases and along with this the excess amount of hydrocarbons which did not contribute the production of the reducing intermediate also increases. In this case, to remove the $NO_x$ well, as explained above, it is necessary to make the excess hydrocarbons oxidize. Therefore, to remove the $NO_x$ well, the larger the amount of excess hydrocarbons, the larger the amount of oxygen which is required.

In this case, if raising the oxygen concentration in the exhaust gas, the amount of oxygen can be increased. Therefore, to remove the $NO_x$ well, when the oxygen concentration in the exhaust gas before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration has to be made.

Figure 13:
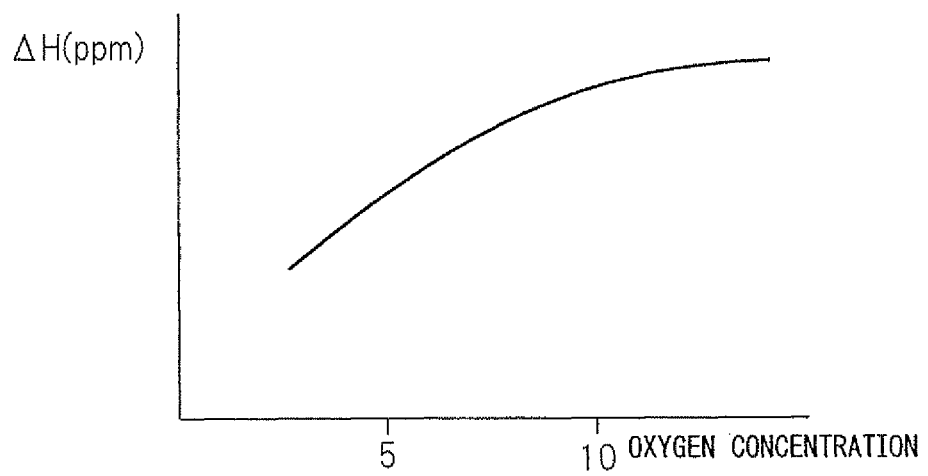
FIG. 13 is a view showing a relationship between an oxygen concentration in exhaust gas and an amplitude $\Delta H$ of a hydrocarbon concentration giving the same $NO_x$ purification rate.

FIG. 13 shows the relationship between the oxygen concentration in the exhaust gas before the hydrocarbons are fed and the amplitude $\Delta H$ of the hydrocarbon concentration when the same $NO_x$ purification rate is obtained. From FIG. 13, it is learned that, to obtain the same $NO_x$ purification rate, the higher the oxygen concentration in the exhaust gas before the hydrocarbons are fed, the greater the amplitude ΔH of the hydrocarbon concentration has to be made. That is, to obtain the same $NO_x$ purification rate, the higher the base air-fuel ratio (A/F)b, the greater the amplitude ΔT of the hydrocarbon concentration has to be made. In other words, to remove the $NO_x$ well, the lower the base air-fuel ratio (A/F)b, the more the amplitude ΔT of the hydrocarbon concentration can be reduced.

Figure 14:
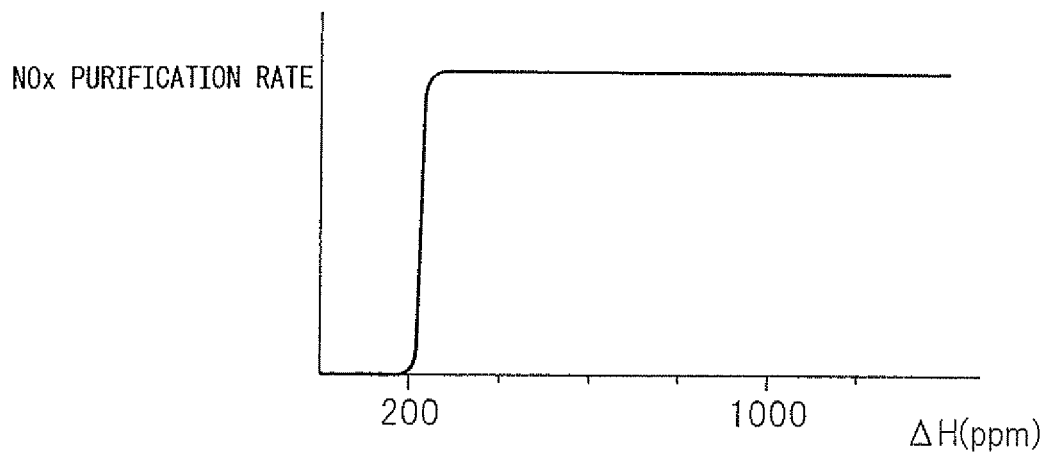
FIG. 14 is a view showing a relationship between an amplitude $\Delta H$ of a hydrocarbon concentration and an $NO_x$ purification rate.

In this regard, the base air-fuel ratio (A/F)b becomes the lowest at the time of an acceleration operation. At this time, if the amplitude ΔH of the hydrocarbon concentration is about 200 ppm, it is possible to remove the $NO_x$ well. The base air-fuel ratio (A/F)b is normally larger than the time of acceleration operation. Therefore, as shown in FIG. 14, if the amplitude ΔH of the hydrocarbon concentration is 200 ppm or more, an excellent $NO_x$ purification rate can be obtained.

On the other hand, it is learned that when the base air-fuel ratio (A/F)b is the highest, if making the amplitude ΔH of the hydrocarbon concentration 10000 ppm or so, an excellent $NO_x$ purification rate is obtained. Therefore, in the present invention, the predetermined range of the amplitude of the hydrocarbon concentration is made 200 ppm to 10000 ppm.

Figure 15:
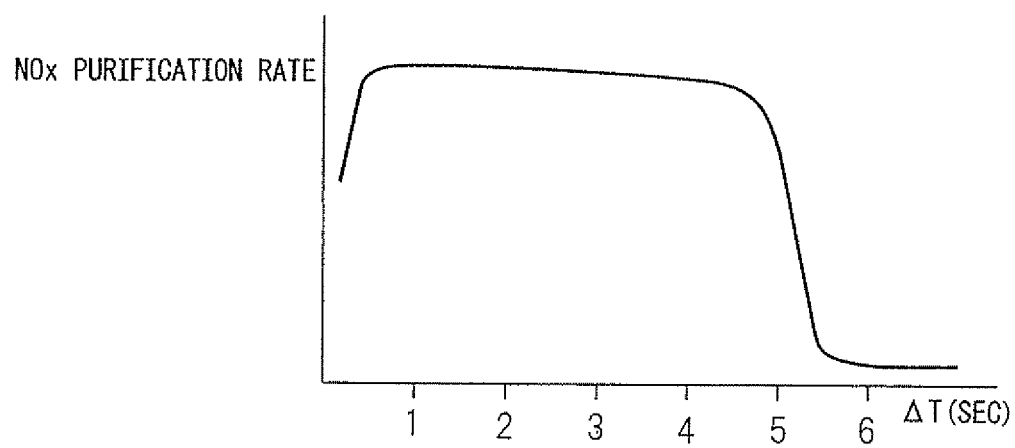
FIG. 15 is a view showing a relationship of a vibration period $\Delta T$ of a hydrocarbon concentration and an $NO_x$ purification rate.

Further, if the vibration period ΔT of the hydrocarbon concentration becomes longer, the oxygen concentration around the active $NO_2$* becomes higher in the time after the hydrocarbons are fed to when the hydrocarbons are next fed. In this case, if the vibration period ΔT of the hydrocarbon concentration becomes longer than about 5 seconds, the active $NO_2$* starts to be absorbed in the form of nitrates inside the basic layer 53. Therefore, as shown in FIG. 15, if the vibration period ΔT of the hydrocarbon concentration becomes longer than about 5 seconds, the $NO_x$ purification rate falls. Therefore, the vibration period of the hydrocarbon concentration, that is, the feed period ΔT of the hydrocarbons, has to be made 5 seconds or less.

On the other hand, if the vibration period ΔT of the hydrocarbon concentration becomes about 0.3 second or less, the fed hydrocarbons start to build up on the exhaust gas flow surface of the exhaust purification catalyst 13, therefore, as shown in FIG. 15, if the vibration period ΔT of the hydrocarbon concentration becomes about 0.3 second or less, the $NO_x$ purification rate falls. Therefore, in the present invention, the vibration period of the concentration of the hydrocarbons, that is, the feed period of the hydrocarbons, is made from 0.3 second to 5 seconds.

Figure 16A:
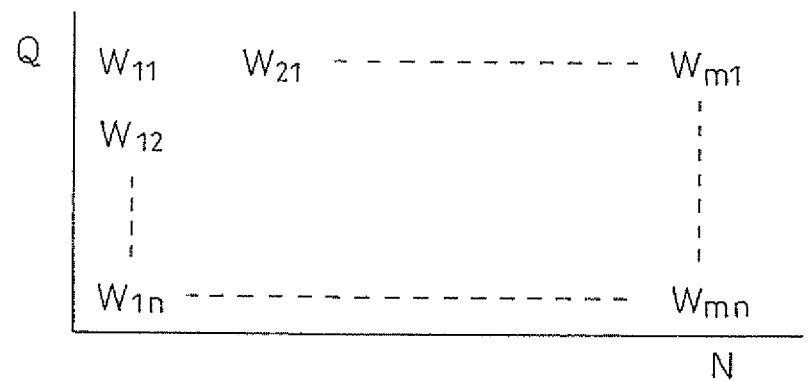
FIGS. 16A, 16B, and 16C are views showing maps of a hydrocarbon feed amount W.

Now, to remove the $NO_x$ by using the first $NO_x$ purification method, as explained above, the air-fuel ratio (A/F)in of the exhaust gas flowing into the exhaust purification catalyst 13 has to be lowered to the demanded minimum air-fuel ratio X. In this embodiment according to the present invention, the hydrocarbon feed amount W which enables the air-fuel ratio (A/F)in of the exhaust gas to be lowered to the demanded minimum air-fuel ratio is stored as a function of the injection amount Q from the fuel injector 3 and the engine speed N in the form of a map such as shown in FIG. 16A in advance in the ROM 32.

Figure 16B:
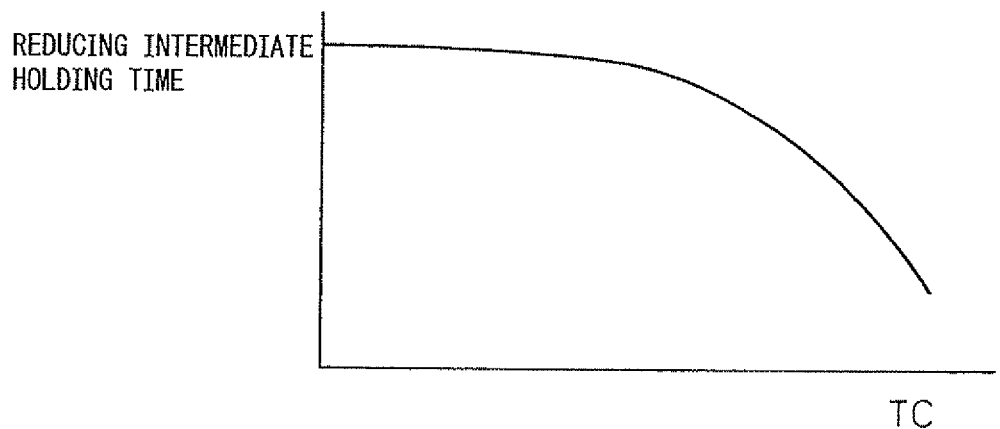
Figure 16C:
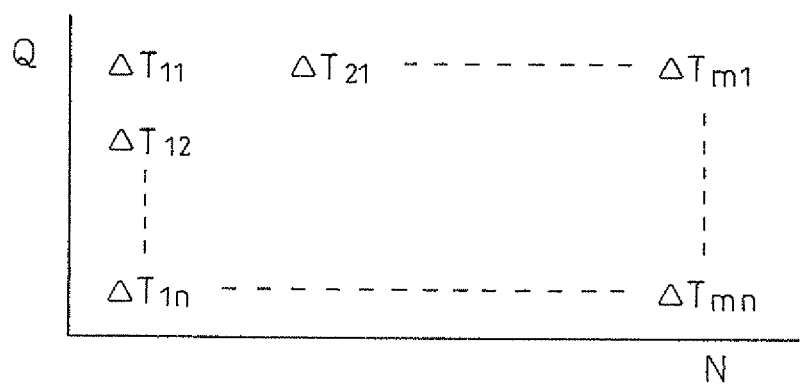

On the other hand, FIG. 16B shows reducing intermediate holding time during which the produced reducing intermediate can be held on the basic layer 53 of the exhaust purification catalyst 13. This reducing intermediate is easily desorbed from the basic layer 53 if the temperature TC of the exhaust purification catalyst 13 rises. Therefore, as shown in FIG. 16B, as the temperature TC of the exhaust purification catalyst 13 rises, the reducing intermediate holding time becomes smaller. In this regard, if the feed period ΔT of the hydrocarbons becomes longer than the reducing intermediate holding time, a period arises during which there is no reducing intermediate and the $NO_x$ purification rate ends up falling. To prevent such a period during which there is no reducing intermediate from arising, the feed period ΔT of the hydrocarbons has to be made equal to the reducing intermediate holding time or shorter than the reducing intermediate holding time. Therefore, in this embodiment according to the present invention, the feed period ΔT of the hydrocarbons is made shorter the higher the temperature TC of the exhaust purification catalyst 13. This feed period ΔT of the hydrocarbons is similarly stored as a function of the injection amount Q and engine speed N in the form of a map such as shown in FIG. 16C in advance in the ROM 32.

Next, while referring to FIG. 17 to FIG. 20, the $NO_x$ purification method in the case when making the exhaust purification catalyst 13 function as an $NO_x$ storage catalyst will be specifically explained. An $NO_x$ purification method in the case when making the exhaust purification catalyst 13 function as an $NO_x$ storage catalyst in this way will be referred to below as a second $NO_x$ purification method.

In this second $NO_x$ purification method, as shown in FIG. 17, when the stored $NO_x$ amount ΣNOX which is stored in the basic layer 53 exceeds the predetermined allowable amount MAX, the air-fuel ratio (A/F)in of the exhaust gas flowing into the exhaust purification catalyst 13 is temporarily made rich. When the air-fuel ratio (A/F)in of the exhaust gas is made rich, the $NO_x$ which was stored in the basic layer 53 when the air-fuel ratio (A/F)in of the exhaust gas was lean is released all at once from the basic layer 53 and reduced. Due to this, the $NO_x$ is removed.

Figure 18:
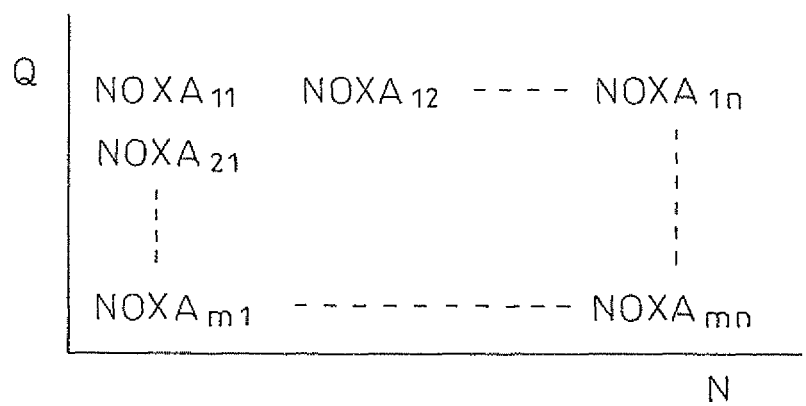
FIG. 18 is a view showing a map of an exhausted $NO_x$ amount NOXA.

The stored $NO_x$ amount ΣNOX is, for example, calculated from the $NO_x$ amount which is exhausted from the engine. In this embodiment according to the present invention, the exhausted $NO_x$ amount NOXA which is exhausted from the engine per unit time is stored as a function of the injection amount Q and engine speed N in the form of a map such as shown in FIG. 18 in advance in the ROM 32. The stored $NO_x$ amount ΣNOX is calculated from this exhausted $NO_x$ amount NOXA. In this case, as shown above, the period in which the air-fuel ratio (A/F)in of the exhaust gas is made rich is usually 1 minute or more.

Figure 19:
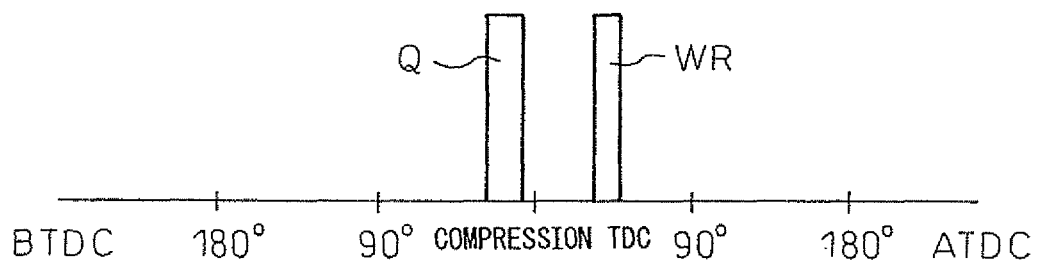
FIG. 19 is a view showing a fuel injection timing.
Figure 20:
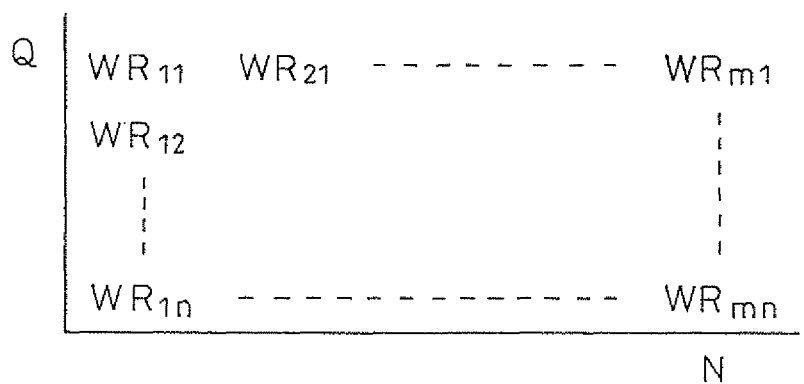
FIG. 20 is a view showing a map of a hydrocarbon feed amount WR.

In this second $NO_x$ purification method, as shown in FIG. 19, additional fuel WR is injected into the combustion chamber 2 from the fuel injector 3 in addition to the combustion-use fuel Q so as to make the air-fuel ratio (A/F)in of the exhaust gas flowing into the exhaust purification catalyst 13 rich. Note that, the abscissa in FIG. 19 shows the crank angle. This additional fuel WR is injected at a timing where it will burn, but will not appear as engine output, that is, slightly before ATDC60° after compression top dead center. This amount of fuel WR is stored as a function of the injection amount Q and engine speed N in the form of a map such as shown in FIG. 20 in advance in the ROM 32. Of course, in this case, it is possible to increase the feed amount of the hydrocarbons from the hydrocarbon feed valve 15 so as to make the air-fuel ratio (A/F)in of the exhaust gas rich.

Now, as explained above, to remove $NO_x$ by using the first $NO_x$ purification method, the air-fuel ratio (A/F)in of the exhaust gas flowing into the exhaust purification catalyst 13 has to be lowered to the demanded minimum air-fuel ratio X. In this case, in the embodiment explained up to here, the hydrocarbons W which are fed from the hydrocarbon feed valve 15 are used to lower the air-fuel ratio (A/F)in of the exhaust gas to the demanded minimum air-fuel ratio X. The method of feeding hydrocarbons W from only the hydrocarbon feed valve 15 so as to lower the air-fuel ratio (A/F)in of the exhaust gas to the demanded minimum air-fuel ratio X in this way will be referred to below as the first hydrocarbon feed method. The change in the air-fuel ratio (A/F)in by this first hydrocarbon feed method is schematically shown in FIG. 21A.

On the other hand, if fuel is injected from the fuel injector 3 toward the combustion chamber 2 after 70° after compression top dead center in the second half of the expansion stroke or in the exhaust stroke, that is, if fuel is injected after the completion of combustion of the combustion-use fuel, this fuel will be cracked without a flame being caused and without being burned. That is, the fuel is reformed to hydrocarbons with a small carbon number. The injection performed after combustion of the combustion-use fuel in this way is called post injection.

Figure 21A:
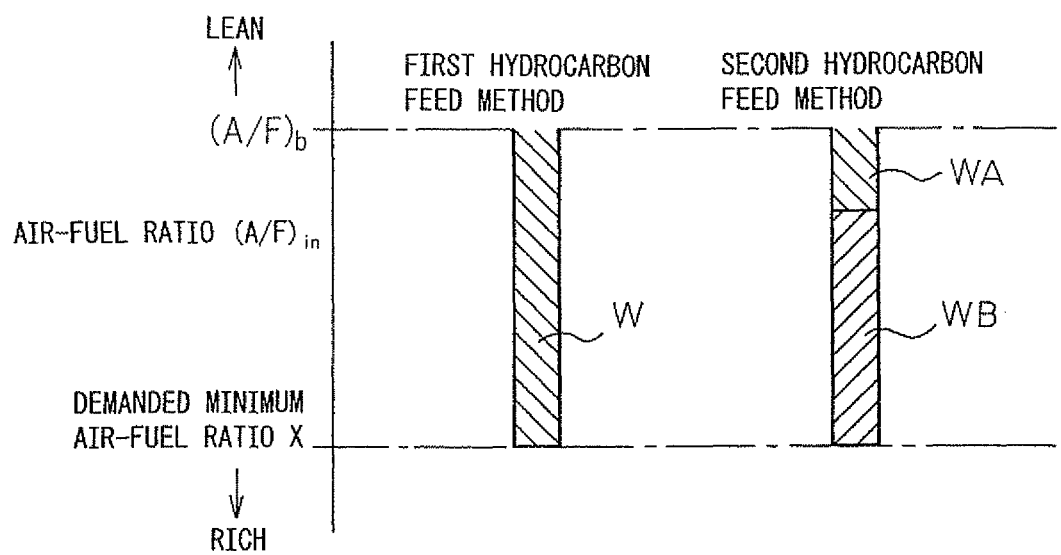
FIGS. 21A and 21B are views for explaining a first hydrocarbon feed method and a second hydrocarbon feed method.
Figure 21B:
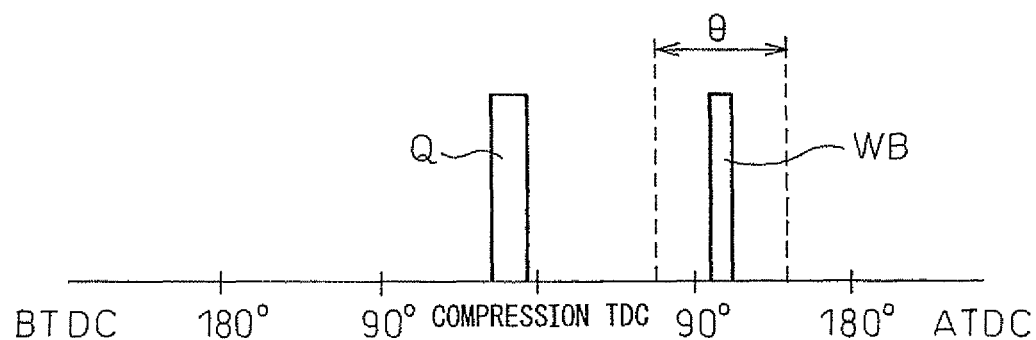

The method of feeding the hydrocarbons using this post injection is schematically shown in FIG. 21A as a second hydrocarbon feed method. As shown in FIG. 21A, in this second hydrocarbon feed method, the hydrocarbons WA fed from the hydrocarbon feed valve 15 and the fuel WB fed by post injection are used to make the air-fuel ratio (A/F)in of the exhaust gas flowing into the exhaust purification catalyst 13 the demanded minimum air-fuel ratio X. This fuel WB fed by post injection is shown in FIG. 21B which is similar to FIG. 19. In this embodiment according to the present invention, this post injection is performed from 70° to 150° after compression top dead center shown by the range θ in FIG. 21B.

Now, in the first hydrocarbon feed method, the majority of the hydrocarbons which are fed from the hydrocarbon feed valve 15 is used to consume the oxygen, that is, to lower the air-fuel ratio (A/F)in, while just a small part of the hydrocarbons which are fed from the hydrocarbon feed valve 15 is used for producing the reducing intermediate. That is, the amount of the hydrocarbons which is used for producing the reducing intermediate is extremely small.

Therefore, in the second hydrocarbon feed method, exactly the amount of hydrocarbons WA required for production of the reducing intermediate is fed from the hydrocarbon feed valve 15, the oxygen is consumed by the fuel WB fed by post injection and thereby the air-fuel ratio (A/F)in is lowered. Note that the fuel WB fed by post injection is also comprised of hydrocarbons, but these hydrocarbons are reformed to hydrocarbons with a small carbon number and therefore are completely oxidized and eliminated. Therefore, no reducing intermediate is produced from this fed fuel WB. The reducing intermediate is produced by the hydrocarbons WA which are partially oxidized.

Figure 22A:
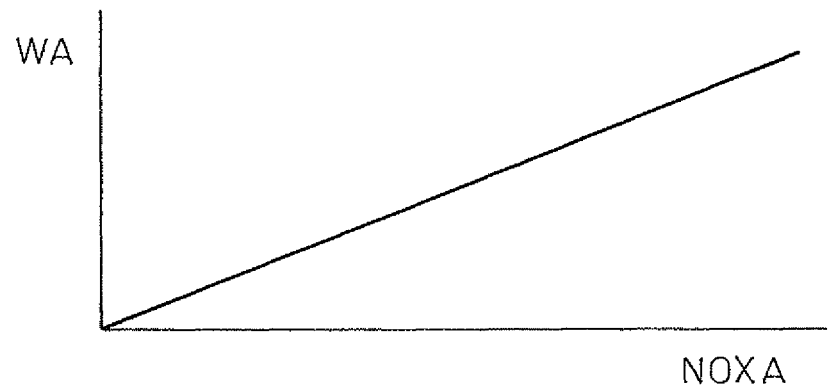
FIGS. 22A, 22B, and 22C are views showing the feed amount WA of hydrocarbons etc.

In this regard, the reducing intermediate is produced from one $NO_x$ and one radical hydrocarbon, so if making the amount (mol) of the radical hydrocarbons the same as the $NO_x$ amount (mol), theoretically all of the $NO_x$ can be reduced. However, to reduce all of the $NO_x$, in practice, several times the radical hydrocarbons are necessary compared with the $NO_x$. Therefore, in this embodiment according to the present invention, while considering this, the feed amount WA of the hydrocarbons are, as shown in FIG. 22A, made to increase the greater the $NO_x$ amount to be reduced, that is, the $NO_x$ amount NOXA exhausted from the engine.

That is, in this embodiment according to the present invention, when the second hydrocarbon feed method is being used, the feed amount WA of the hydrocarbons which are fed from the hydrocarbon feed valve 15 is determined in accordance with the amount of the $NO_x$ in the exhaust gas which flows into the exhaust purification catalyst 13.

Figure 22B:
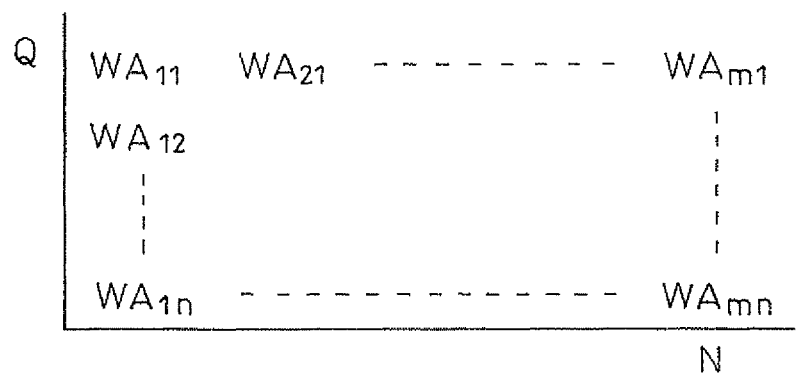

Here, the $NO_x$ amount NOXA which is exhausted from the engine, as shown in FIG. 18, is a function of the injection amount Q and the engine speed N. The feed amount WA of the hydrocarbons is also a function of the injection amount Q and engine speed N. Therefore, in this embodiment according to the present invention, the feed amount WA of the hydrocarbons is stored as a function of the injection amount Q and engine speed N in the form of a map such as shown in FIG. 22B in advance in the ROM 32.

Figure 22C:
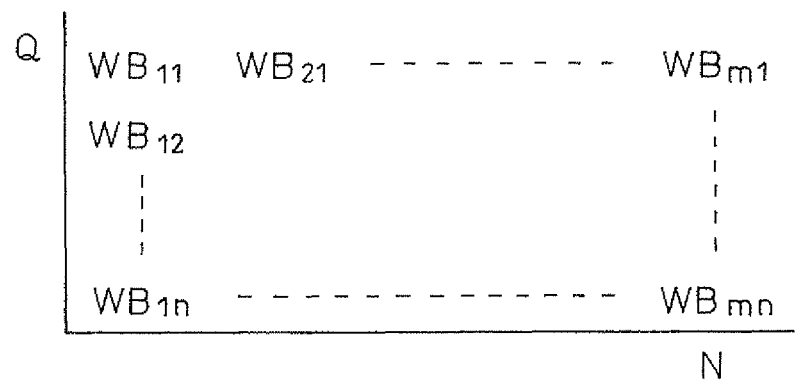

On the other hand, if the injection amount Q and engine speed N are determined, the base air-fuel ratio (A/F)b is determined, the demanded minimum air-fuel ratio X is determined, and the feed amount WA of the hydrocarbons is determined. Therefore, as will be understood from FIG. 21A, at this time, the fuel feed amount WB due to the post injection is also determined. Therefore, in this embodiment according to the present invention, the fuel feed amount WB due to the post injection is also stored as a function of the injection amount Q and engine speed N in the form of a map such as shown in FIG. 22C in advance in the ROM 32.

Figure 23:
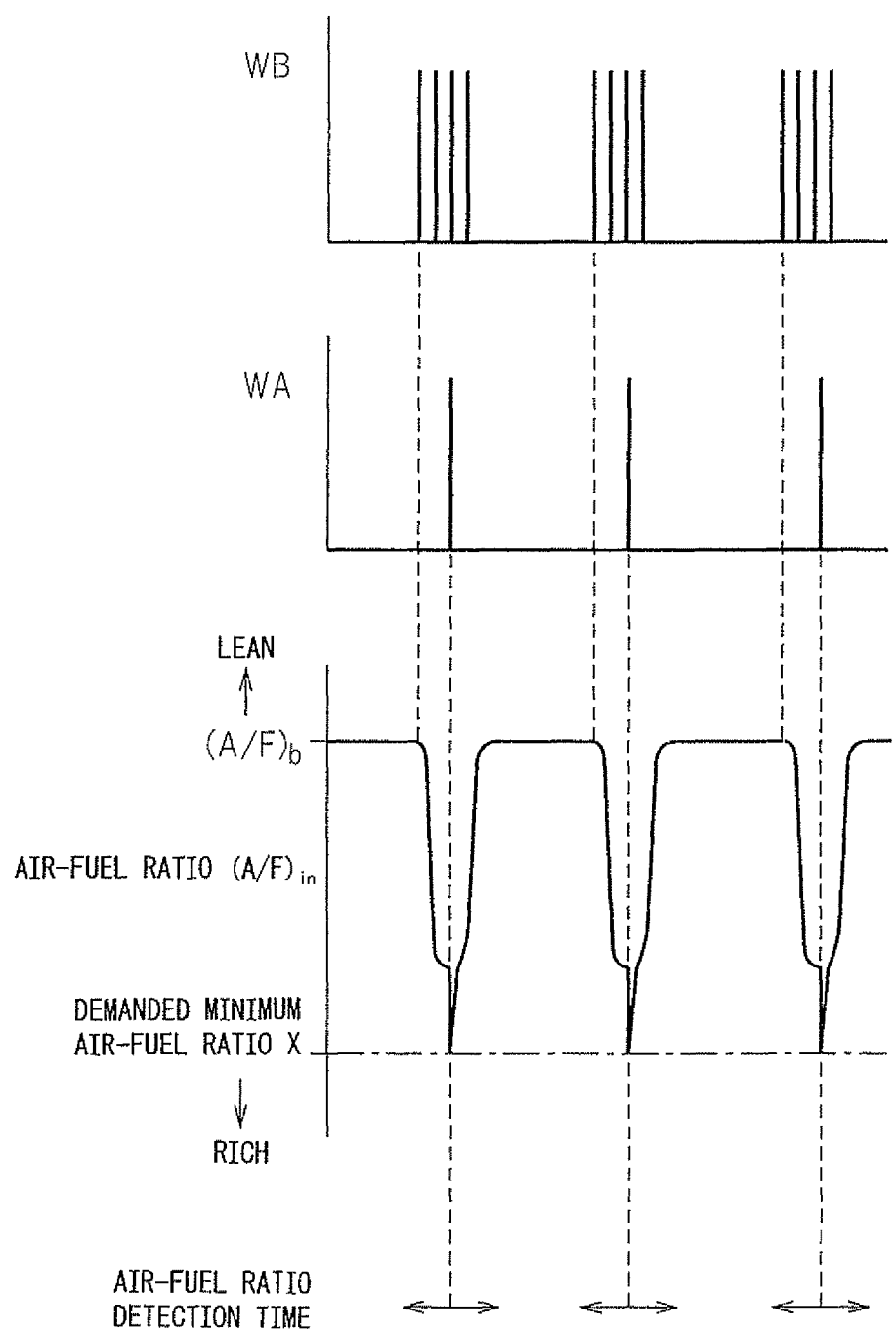
FIG. 23 is a time chart showing changes in the air-fuel ratio of the exhaust gas flowing to the exhaust purification catalyst etc.
Figure 24:
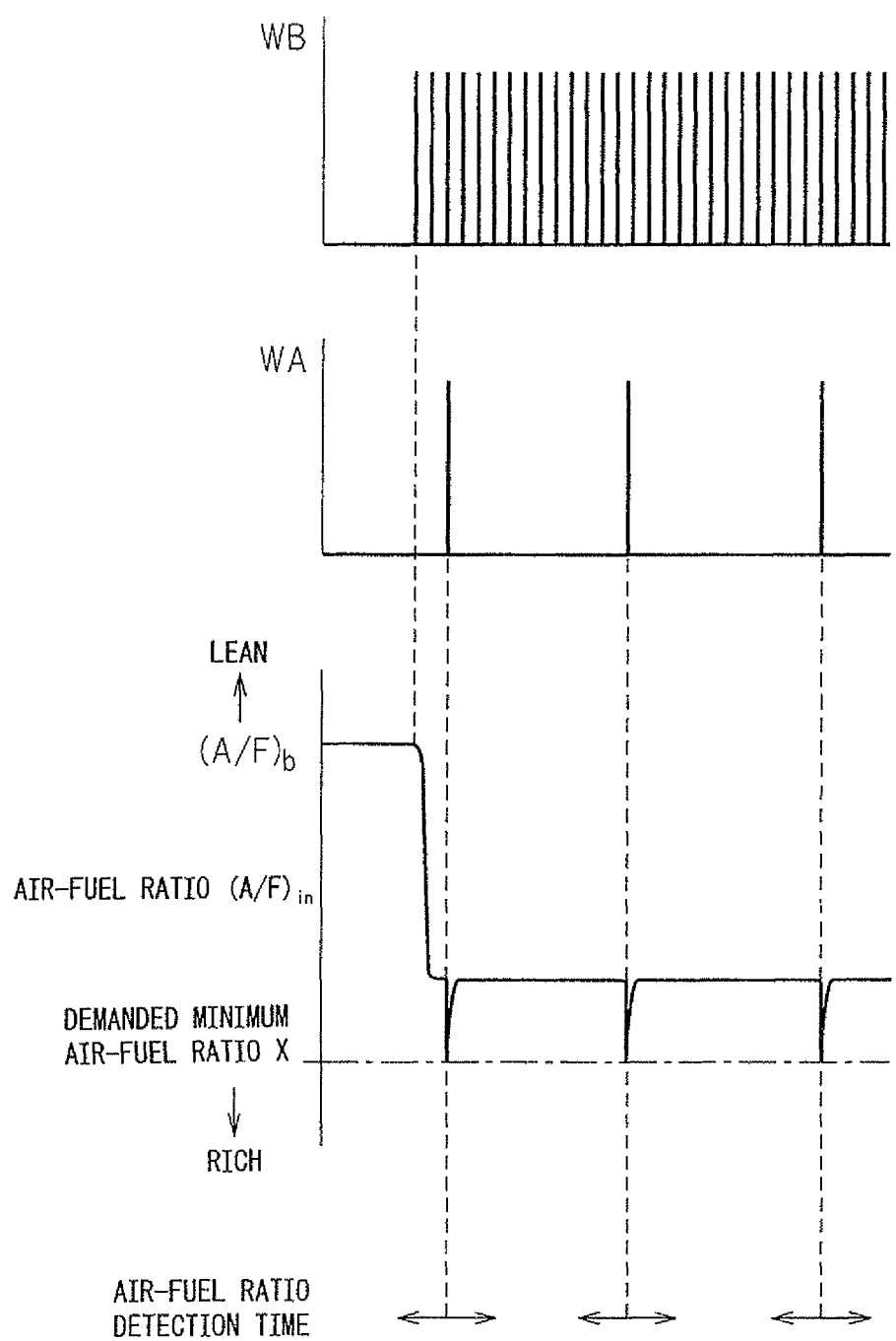
FIG. 24 is a time chart showing changes in the air-fuel ratio of the exhaust gas flowing to the exhaust purification catalyst etc.

FIG. 23 and FIG. 24 respectively show specific examples of the second hydrocarbon feed control.

In the example shown in FIG. 23, the case is shown where fuel WB is fed by post injection in several consecutive expansion strokes from a little before the hydrocarbons WA are fed from the hydrocarbon feed valve 15 to right after the hydrocarbons WA are fed. In this case, due to the feed of the fuel WB by the post injection, the air-fuel ratio (A/F)in is lowered. Due to the feed of the hydrocarbons WA, the air-fuel ratio (A/F)in is lowered to the demanded minimum air-fuel ratio X.

On the other hand, in the example shown in FIG. 24, when the second hydrocarbon feed control is started, fuel WB is fed by post injection at every expansion stroke. Therefore, in this example, if the second hydrocarbon feed control is started, the air-fuel ratio (A/F)in is continuously lowered. When hydrocarbons WA are fed, the air-fuel ratio (A/F)in is lowered to the demanded minimum air-fuel ratio X.

In this regard, fuel fed by post injection easily reacts with oxygen due to cranking, so if feeding fuel by post injection, there is the advantage that it is possible to consume oxygen more easily compared with the case of feeding hydrocarbons from the hydrocarbon feed valve 15. On the other hand, when using post injection, there is the bother that both post injection and feed control of the hydrocarbons WA are necessary.

Therefore, in the present invention, considering these, at the time of engine operation, a first hydrocarbon feed method which injects hydrocarbons W from the hydrocarbon feed valve 15 by the predetermined feed interval ΔT so that the air-fuel ratio (A/F)in of the exhaust gas falls to a predetermined air-fuel ratio X and thereby removes $NO_x$ contained in exhaust gas and a second hydrocarbon feed method which lowers the feed amount of hydrocarbons from the hydrocarbon feed valve 15 and feeds the fuel WB required for making the air-fuel ratio (A/F)in of the exhaust gas fall to the predetermined air-fuel ratio X into the combustion chamber 2 during the second half of the expansion stroke or the exhaust stroke are selectively used.

On the other hand, as explained above, fuel WB from post injection is easier to oxidize the hydrocarbons WA. Therefore, feeding fuel WB by post injection gives a higher heat of oxidation reaction than feeding only hydrocarbons WA. Therefore, in this embodiment, according to the present invention, the second hydrocarbon feed method is used when raising the temperature of an exhaust treatment device such as the exhaust purification catalyst 13 or particulate filter 14.

Figure 25A:
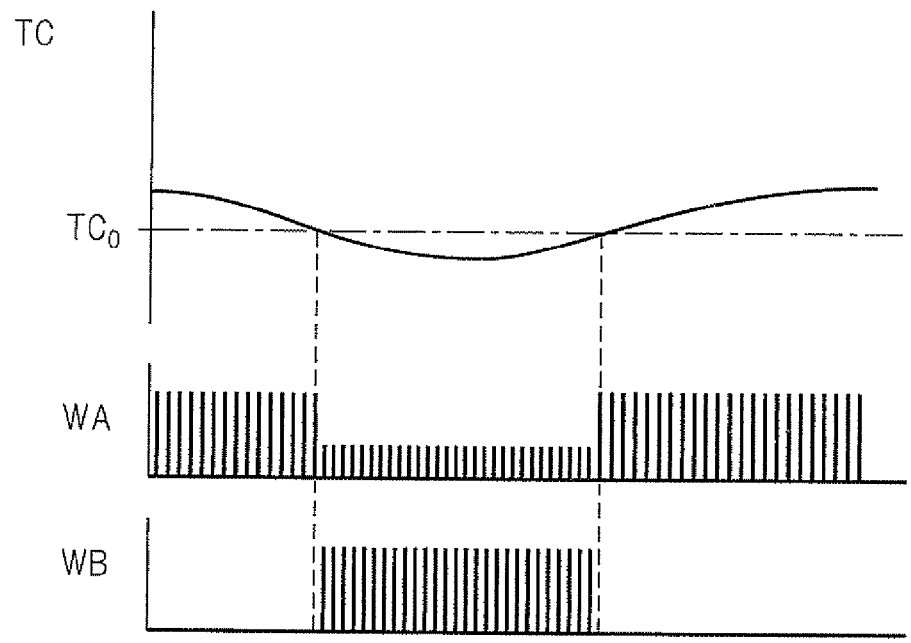
FIGS. 25A and 25B are timing charts showing temperature elevation control.

FIG. 25A shows the temperature elevation control of the exhaust purification catalyst 13. For example, at the time of engine operation, if the engine load falls, the exhaust temperature falls, and the temperature TC of the exhaust purification catalyst 13 falls to below the predetermined activation temperature $TC_0$, the $NO_x$ purification rate falls. Therefore, as shown in FIG. 25A, when the temperature TC of the exhaust purification catalyst 13 is higher than the activation temperature $TC_0$, the first hydrocarbon feed method is used, while when the temperature TC of the exhaust purification catalyst 13 falls to below the activation temperature $TC_0$, the second hydrocarbon feed method is used for raising the temperature of the exhaust purification catalyst 13.

That is, in the embodiment shown in FIG. 25A, when the temperature TC of the exhaust purification catalyst 13 falls below the predetermined activation temperature $TC_0$, the first hydrocarbon feed method is switched to the second hydrocarbon feed method and a temperature elevation action of the exhaust purification catalyst 13 is performed.

Figure 25B:
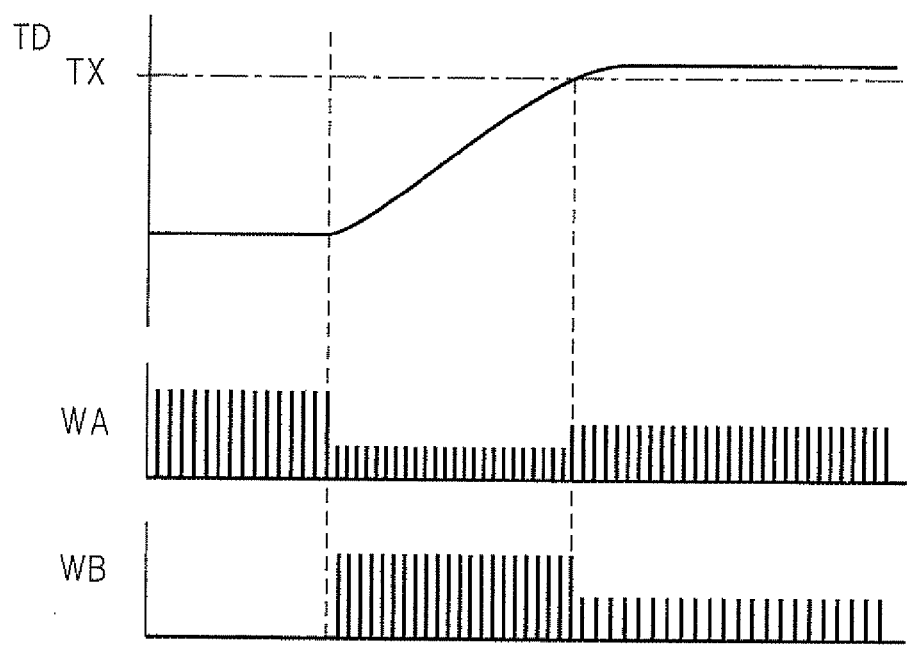

FIG. 25B shows the temperature elevation control of the particulate filter 14. To burn off the particulate deposited on the particulate filter 14 to regenerate the particulate filter 14, it is necessary to raise the temperature TD of the particulate filter 14 to a 600° C. or higher regeneration temperature TX. Therefore, in the embodiment shown in FIG. 25B, when the particulate filter 14 should be regenerated, the first hydrocarbon feed method is switched to the second hydrocarbon feed method. Due to this, a temperature elevation action of the particulate filter 14 is performed. Note that, in this embodiment, if the temperature TD of the particulate filter 14 exceeds the regeneration temperature TX, subsequently feed of a small amount of fuel WB by post injection is continued to maintain the temperature TD of the particulate filter 14 at the regeneration temperature TX or more.

Next, the operational control method by the present invention will be explained.

Figure 26:
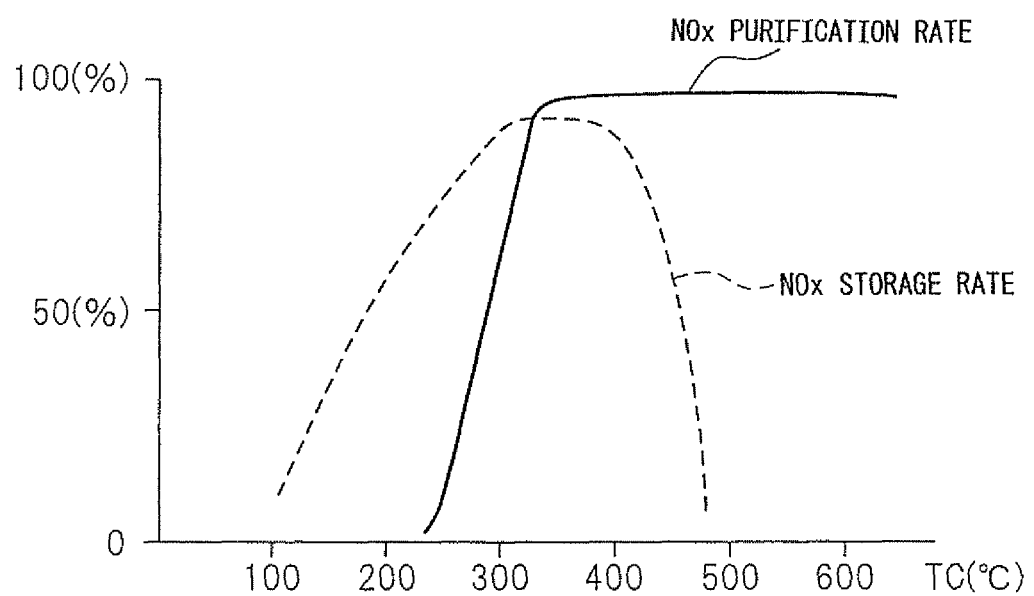
FIG. 26 is a view showing an $NO_x$ purification rate and $NO_x$ storage rate.

FIG. 26 shows the $NO_x$ purification rate at the time when $NO_x$ purification treatment is performed by the first $NO_x$ purification method and the $NO_x$ storage rate to the exhaust purification catalyst 13 at the time when the second $NO_x$ purification method is used. In the present invention, when the $NO_x$ purification rate is higher than the $NO_x$ storage rate, that is, when the temperature TC of the exhaust purification catalyst 13 is relatively high, the first $NO_x$ purification method is used, while when the $NO_x$ storage rate is higher than the $NO_x$ purification rate, that is, when the temperature TC of the exhaust purification catalyst 13 is low, the second $NO_x$ purification method is used. Therefore, at the time of engine startup, usually the second $NO_x$ purification method is used, while when the temperature TC of the exhaust purification catalyst 13 becomes high, the second $NO_x$ purification method is switched to the first $NO_x$ purification method.

On the other hand, in the present Invention, when the second hydrocarbon feed control is performed using the first $NO_x$ purification method, the amount of fuel WB by post injection is controlled with feedback so that the air-fuel ratio (A/F)in of the exhaust gas reliably falls to the demanded minimum air-fuel ratio X. For this feedback control, it is necessary to detect the actual minimum air-fuel ratio when the second hydrocarbon feed method is used.

Figure 27:
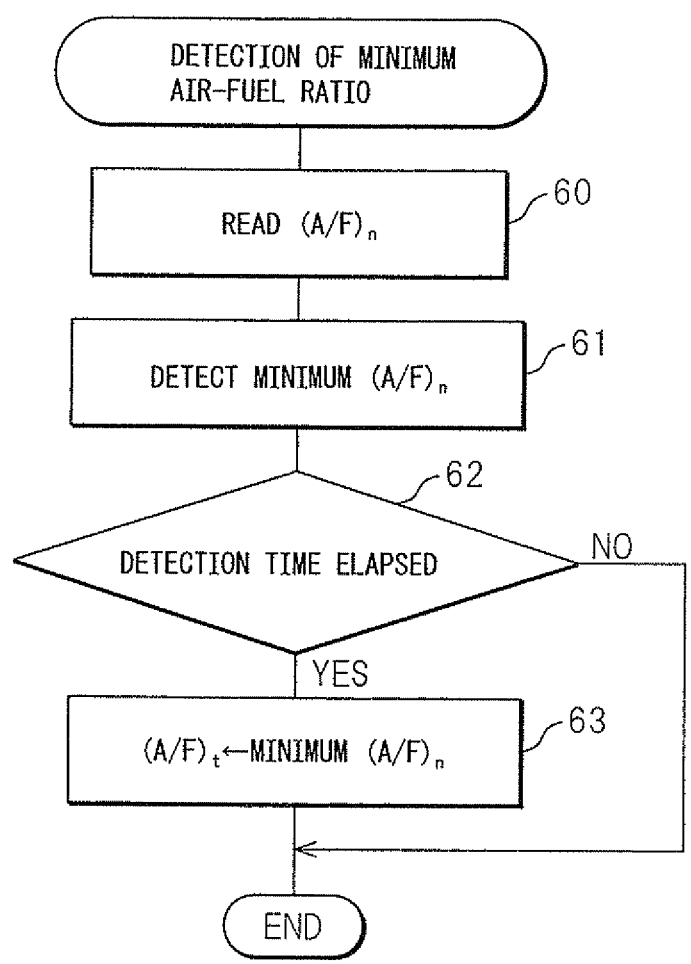
FIG. 27 is a flow chart for detecting a minimum air-fuel ratio.

FIG. 27 shows the routine for detecting this actual minimum air-fuel ratio. This routine is executed by interruption every predetermined time for exactly the air-fuel ratio detection time shown in FIG. 23 and FIG. 24.

Referring to FIG. 27, first, at step 60, the air-fuel ratio (A/F)n of the exhaust gas which is detected by the air-fuel ratio sensor 26 is read. Next, at step 61, the air-fuel ratio (A/F)in becoming the minimum within the air-fuel ratio detection time is detected. Next, at step 62, it is judged if the air-fuel ratio detection time has elapsed. When the air-fuel ratio detection time has elapsed, the routine proceeds to step 63 where the air-fuel ratio (A/F)n becoming the minimum is made the minimum air-fuel ratio (A/F)t.

Figure 28:
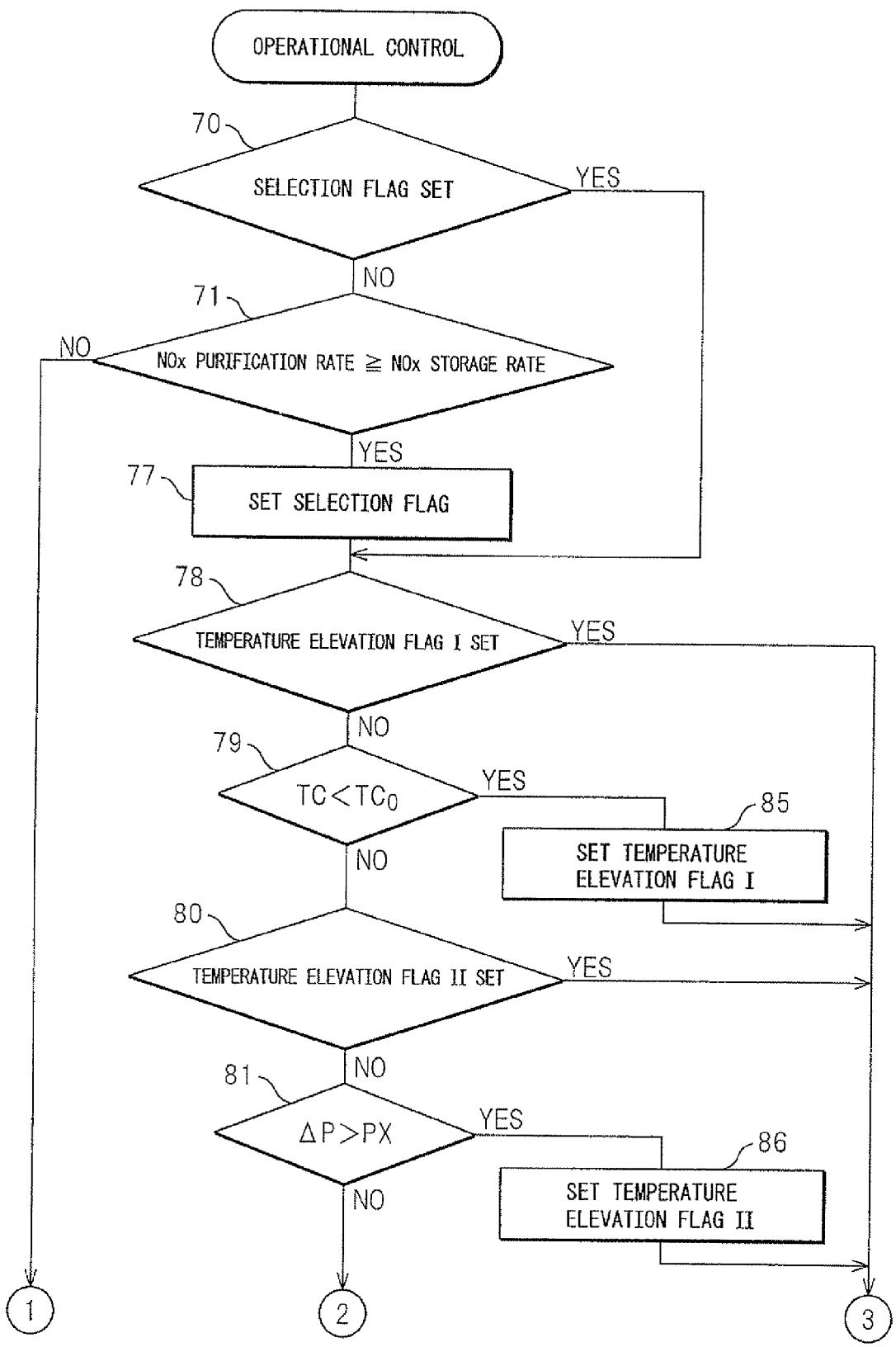
FIG. 28 and FIG. 29 are flow charts for operational control.
Figure 29:
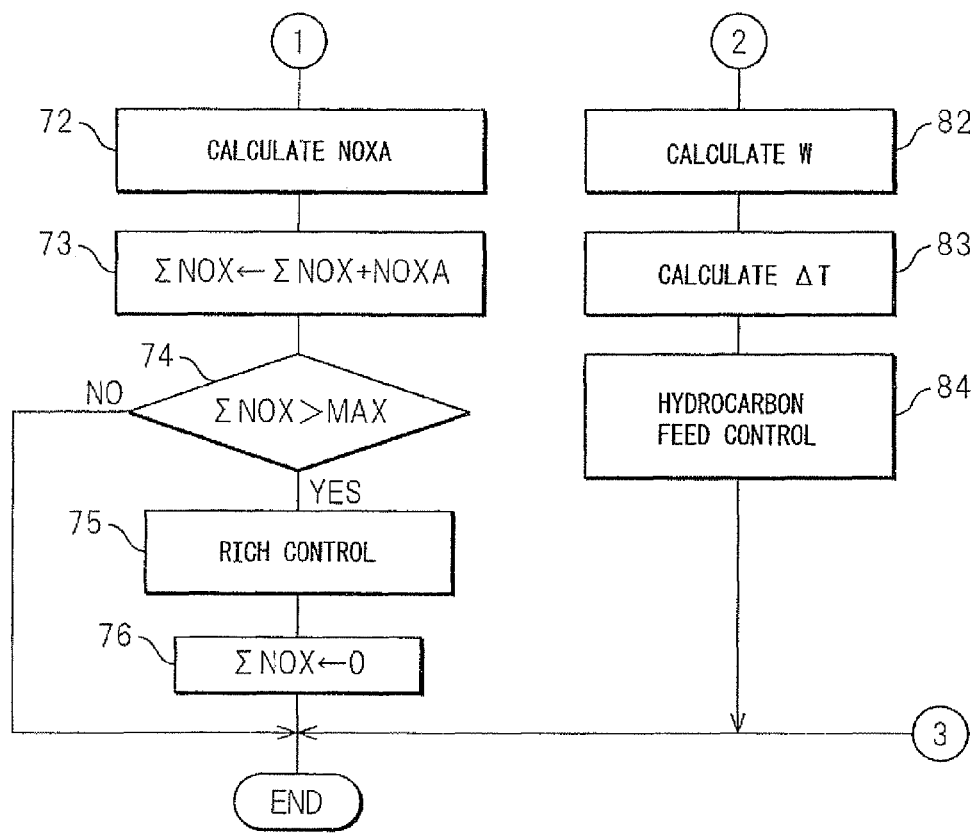

FIG. 28 and FIG. 29 show an engine operational control routine. This routine is also performed by interruption every predetermined time.

Referring to FIG. 28, first, at step 70, it is judged if a selection flag showing that the first $NO_x$ purification method should be selected is set. When the selection flag is not set, the routine proceeds to step 71 where it is judged if the $NO_x$ purification rate at the time when the first $NO_x$ purification method is used for an $NO_x$ purification treatment is higher than an $NO_x$ storage rate to the exhaust purification catalyst 13 at the time when the second $NO_x$ purification method is being used. When the $NO_x$ purification rate is lower than the $NO_x$ storage rate, the routine proceeds to step 72 of FIG. 29 where the second $NO_x$ purification method is executed.

That is, at step 72, the $NO_x$ amount NOXA exhausted per unit time is calculated from the map shown in FIG. 18. Next, at step 73, $\Sigma NOX$ is increased by the exhausted $NO_x$ amount NOXA to calculate the stored $NO_x$ amount $\Sigma NOX$. Next, at step 74, it is judged if stored $NO_x$ amount $\Sigma NOX$ exceeds the allowable value MAX. When $\Sigma NOX > MAX$, the routine proceeds to step 75 where the additional fuel amount WR is calculated from the map shown in FIG. 20 and the action of injection of additional fuel is performed. Next, at step 76, $\Sigma NOX$ is cleared.

On the other hand, when it is judged at step 71 of FIG. 71 that the $NO_x$ purification rate is higher than the $NO_x$ storage rate, the routine proceeds to step 77 where the selection flag is set, then the routine proceeds to step 78. Once the selection flag is set, after that the routine jumps from step 70 to step 78. At step 78, it is judged if a temperature elevation flag I showing that the temperature elevation control of the exhaust purification catalyst 13 shown in FIG. 25A should be performed is set. When the temperature elevation flag I is not set, the routine proceeds to step 79.

At step 79, it is judged if the temperature TC of the exhaust purification catalyst 13 which is detected by the temperature sensor 23 falls to more than the activation temperature $TC_0$. When $TC \geq TC_0$, the routine proceeds to step 80 where it is judged if a temperature elevation flag II showing that the temperature elevation control of the particulate filter 14 shown in FIG. 25B should be performed is set. When the temperature elevation flag II is not set, the routine proceeds to step 81 where it is judged if the differential pressure $\Delta P$ before and after the particulate filter 14 which is detected by the differential pressure sensor 24 becomes higher than the allowable value PX. When $\Delta P \leq PX$, the routine proceeds to step 82 of FIG. 29 where hydrocarbons are fed by the first hydrocarbon feed method.

That is, at step 82, the feed amount W of hydrocarbons is calculated from the map shown in FIG. 16A. Next, at step 83, the feed period $\Delta T$ of the hydrocarbons is calculated from the map shown in FIG. 16C. Next, at step 84, the hydrocarbon feed control in which the feed amount W of hydrocarbons is fed from the hydrocarbon feed valve 15 by the feed period $\Delta T$ is performed.

On the other hand, when it is judged at step 79 of FIG. 28 that $TC < TC_0$, the routine proceeds to step 85 where the temperature elevation flag I is set and the processing cycle is ended. Once the temperature elevation flag I is set, the routine proceeds through step 78 and the processing cycle is ended. That is, when the temperature elevation flag I is set, control for feed of hydrocarbons by the first hydrocarbon feed method is stopped. At this time, at the time interruption routine shown in FIG. 30, temperature elevation control of the exhaust purification catalyst 13 is performed.

Further, when it is judged at step 81 of FIG. 28 that $\Delta P > PX$, the routine proceeds to step 86 where the temperature elevation flag II is set and the processing cycle is ended. Once the temperature elevation flag II is set, the routine proceeds through step 80 and the processing cycle is ended. That is, when the temperature elevation flag II is set, control for feed of hydrocarbons by the first hydrocarbon feed method is stopped. At this time, at the time interruption routine shown in FIG. 31, temperature elevation control of the particulate filter 14 is performed.

Figure 30:
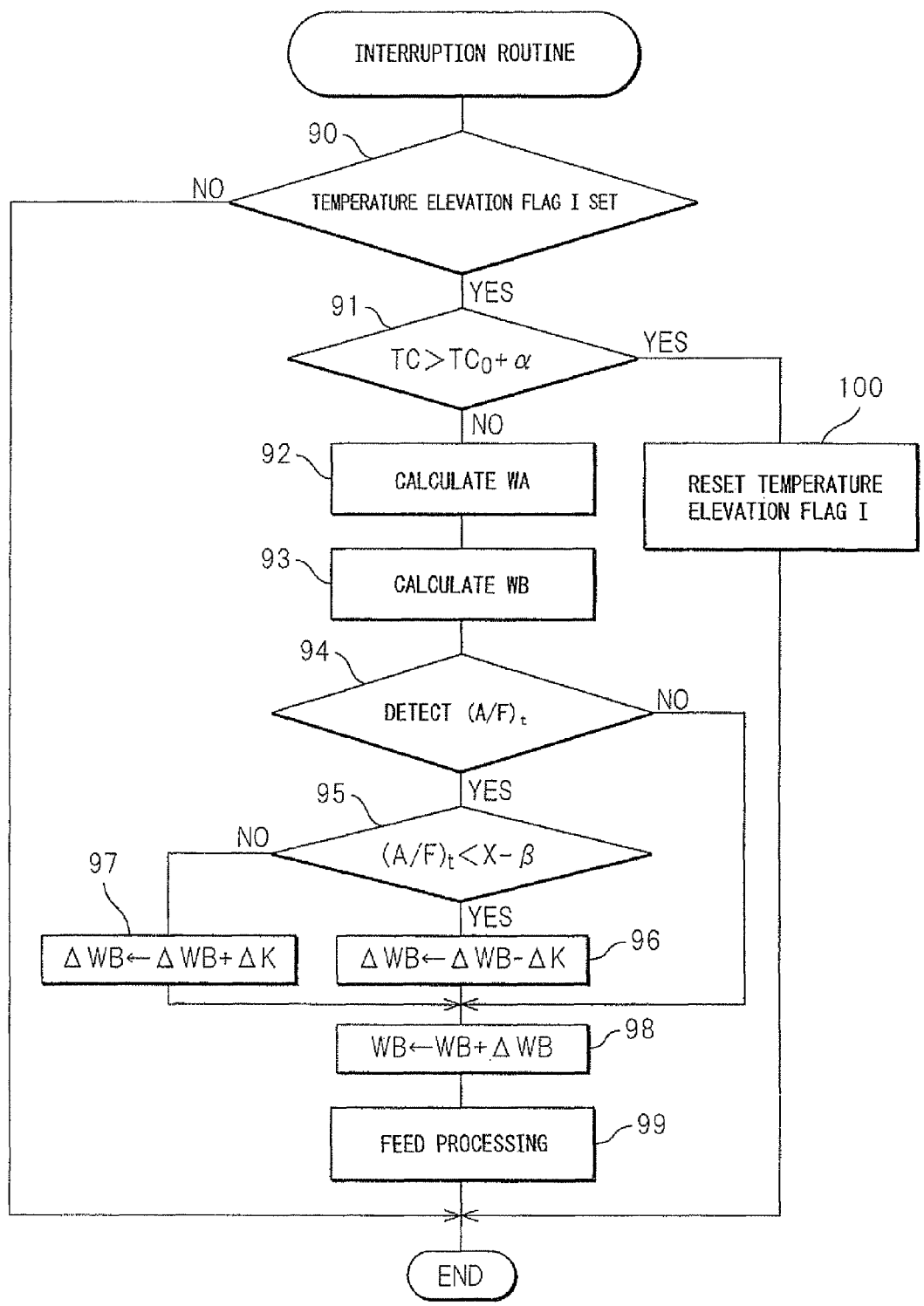
FIG. 30 is a flow chart showing an interruption routine.

Referring to the time interruption routine shown in FIG. 30, first, at step 90, it is judged if the temperature elevation flag I is set. When the temperature elevation flag I is set, the routine proceeds to step 91 where it is judged if the temperature TC of the exhaust purification catalyst 13 becomes higher than the temperature $(TC_0+\alpha)$ of the activation temperature $TC_0$ plus a constant value $\alpha$. When $TC \leq TC_0+\alpha$, the routine proceeds to step 92 where temperature elevation control of the exhaust purification catalyst 13 shown in FIG. 25A is performed.

That is, first, at step 92, the feed amount WA of the hydrocarbons is calculated from the map shown in FIG. 22B. Next, at step 93, the fuel feed amount WB due to the post injection is calculated from the map shown in FIG. 22C. Next, at step 94, it is judged if the detection of the minimum air-fuel ratio (A/F)t by the routine shown in FIG. 27 has been completed. When it is first judged that the minimum air-fuel ratio (A/F)t has been detected, the routine proceeds to step 95. After that, the routine jumps to step 98.

At step 95, it is judged if the detected minimum air-fuel ratio (A/F)t falls to more than the air-fuel ratio $(X-\beta)$ of the demanded minimum air-fuel ratio X minus the constant value $\beta$. When $(A/F)t \geq X-\beta$, that is, when the detected minimum air-fuel ratio (A/F)t does not fall to the air-fuel ratio $(X-\beta)$, the routine proceeds to step 97 where the correction value $\Delta WB$ for the fuel feed amount WB is increased by the constant value $\Delta K$. Next, the routine proceeds to step 98. As opposed to this, when it was judged at step 95 that $(A/F)t<X-\beta$, the routine proceeds to step 96 where the correction value $\Delta WB$ is decreased by the constant value $\Delta K$, then the routine proceeds to step 98.

At step 98, the fuel feed amount WB is calculated from the correction value $\Delta WB$. Next, at step 99, the feed amount WA of hydrocarbons is fed from the hydrocarbon feed valve 15 by the feed period $\Delta T$ which is calculated from the map shown in FIG. 16C, and, as shown in FIG. 23, from slightly before the action of feed of the hydrocarbons, the amount of feed WA of hydrocarbons is fed into the combustion chamber 2 by post injection. On the other hand, when it is judged at step 91 that $TC>TC_0+\alpha$, the routine proceeds to step 100 where the temperature elevation flag I is reset.

Next, if referring to the time interruption routine shown in FIG. 31, first, at step 110, it is judged if the temperature elevation flag II is set. When the temperature elevation flag II is set, the routine proceeds to step 111 where it is judged if the temperature TD of the particulate filter 14 becomes higher than the regeneration temperature TX. When $TD \leq TX$, the routine proceeds to step 112 where the temperature elevation control of the particulate filter 14 shown in FIG. 25B is performed.

That is, first, at step 112, the feed amount WA of the hydrocarbons is calculated from the map shown in FIG. 22B, next, at step 113, the fuel feed amount WB due to the post injection is calculated from the map shown in FIG. 22C. Next, at step 114, it is judged if the detection of the minimum air-fuel ratio (A/F)t by the routine shown in FIG. 27 has been completed. When it is first judged that the minimum air-fuel ratio (A/F)t has been detected, the routine proceeds to step 115. After that, the routine jumps to step 118.

At step 115, it is judged if the detected minimum air-fuel ratio (A/F)t has fallen below the air-fuel ratio $(X-\beta)$ of the demanded minimum air-fuel ratio X minus the constant value $\beta$. When $(A/F)t \geq X-\beta$, the routine proceeds to step 117 where the correction value $\Delta WB$ for the fuel feed amount WB is increased by the constant value $\Delta K$. Next, the routine proceeds to at step 118. As opposed to this, when it is judged at step 115 that $(A/F)t<X-\beta$, the routine proceeds to step 116 where the correction value $\Delta WB$ is reduced by the constant value $\Delta K$, then the routine proceeds to step 118.

At step 118, the fuel feed amount WB is calculated from the correction value $\Delta WB$. Next, at step 119, the feed amount WA of hydrocarbons is fed from the hydrocarbon feed valve 15 by the feed period $\Delta T$ which is calculated from the map shown in FIG. 16C, and, as shown in FIG. 23, from slightly before the feed action of the hydrocarbons, the amount of feed WB of fuel is fed into the combustion chamber 2 by post injection.

On the other hand, when it is judged at step 111 that TD>TX, the routine proceeds to step 120 where the temperature maintenance control which maintains the temperature TD of the particulate filter 14 at the regeneration temperature TX or more by performing post injection as shown in FIG. 25B, is performed. Next, at step 121, it is judged if the regeneration processing has been completed. When it is judged that the regeneration processing has been completed, the routine proceeds to step 122 where the temperature elevation flag II is reset.

Note that, as another embodiment, in the engine exhaust passage upstream of the exhaust purification catalyst 13, an oxidation catalyst for reforming the hydrocarbons can be arranged.

REFERENCE SIGNS LIST

4 . . . intake manifold
5 . . . exhaust manifold
7 . . . exhaust turbocharger
12 . . . exhaust pipe
13 . . . exhaust purification catalyst
14 . . . particulate filter
15 . . . hydrocarbon feed valve

The invention claimed is:

1. An exhaust purification system of an internal combustion engine, the exhaust purification system comprising:
a hydrocarbon feed valve for feeding hydrocarbons arranged inside an engine exhaust passage;
an exhaust purification catalyst for causing a reaction between the hydrocarbons injected from the hydrocarbon feed valve and NOx contained in exhaust gas arranged in the engine exhaust passage downstream of the hydrocarbon feed valve;
a precious metal catalyst carried on an exhaust gas flow surface of the exhaust purification catalyst;
a basic exhaust gas flow surface part formed around the precious metal catalyst; and
an electronic control unit,
wherein the electronic control unit is configured to control the injection of the hydrocarbons from the hydrocarbon feed valve at predetermined intervals by a first hydrocarbon feed method and a second hydrocarbon feed method, so that an air-fuel ratio of the exhaust gas falls to a predetermined air-fuel ratio, and is configured to control the feed intervals of the hydrocarbons longer than the predetermined feed intervals, wherein when the electronic control unit is configured to control the injection of hydrocarbons from the hydrocarbon feed valve at the predetermined intervals, the exhaust purification catalyst has a property of chemically reducing the NOx that is contained in the exhaust gas, in the first hydrocarbon feed method, the electronic control unit is configured to control the injection of hydrocarbons from the hydrocarbon feed valve at the predetermined feed intervals so that the air-fuel ratio of the exhaust gas falls to the predetermined air-fuel ratio, thereby chemically reducing the NOx contained in the exhaust gas, in the second hydrocarbon feed method, the electronic control unit is configured to control the feed amount of the hydrocarbons from the hydrocarbon feed valve at the predetermined feed intervals in a feed amount that is lower than that of the first hydrocarbon feed method, and the electronic control unit is configured to simultaneously control the feeding of a fuel required for lowering the air-fuel ratio of the exhaust gas to the required air-fuel ratio into a combustion chamber during a second half of an expansion stroke or an exhaust stroke, thereby chemically reducing the NOx contained in the exhaust gas, and the electronic control unit is configured to selectively perform the first or the second hydrocarbon feed method in accordance with an operating state of the engine, and when the electronic control unit controls the injections of the hydrocarbons from the hydrocarbon feed valve longer than the predetermined intervals, the exhaust purification catalyst has a property of being increased in a storage amount of NOx that is contained in the exhaust gas.

2. The exhaust purification system of the internal combustion engine as claimed in claim 1, wherein the second hydrocarbon feed method is used when raising a temperature of an exhaust treatment device.

3. The exhaust purification system of the internal combustion engine as claimed in claim 2, wherein the exhaust treatment device is comprised of the exhaust purification catalyst and wherein, when the temperature of the exhaust purification catalyst falls below a predetermined activation temperature, the first hydrocarbon feed method is switched to the second hydrocarbon feed method, and a temperature elevation action of the exhaust purification catalyst is performed.

4. The exhaust purification system of the internal combustion engine as claimed in claim 2, wherein the exhaust treatment device is comprised of a particulate filter that is arranged inside of the engine exhaust passage and wherein when the particulate filter should be regenerated, the first hydrocarbon feed method is switched to the second hydrocarbon feed method, and a temperature elevation action of the particulate filter is performed.

5. The exhaust purification system of the internal combustion engine as claimed in claim 1, wherein the NOx contained in the exhaust gas and reformed hydrocarbons are reacted inside the exhaust purification catalyst whereby a reducing intermediate containing nitrogen and hydrocarbons is produced and wherein the predetermined feed period of the hydrocarbons is a feed period required for continued production of the reducing intermediate.

6. The exhaust purification system of the internal combustion engine as claimed in claim 5, wherein the feed period of the hydrocarbons is between 0.3 second to 5 seconds.

7. The exhaust purification system of the internal combustion engine as claimed in claim 1, wherein the precious metal catalyst is comprised of platinum Pt and at least one of rhodium Rh and palladium Pd.

8. The exhaust purification system of the internal combustion engine as claimed in claim 1, wherein a basic layer containing an alkali metal, an alkali earth metal, a rare earth, or a metal that can donate electrons to NOx is formed on the exhaust gas flow surface of the exhaust purification catalyst and wherein the surface of the basic layer forms the basic exhaust gas flow surface part.

9. The exhaust purification system of the internal combustion engine as claimed in claim 1, wherein when the second hydrocarbon feed method is used, the feed amount of the hydrocarbons that are fed from the hydrocarbon feed valve is determined in accordance with an amount of NOx in the exhaust gas flowing into the exhaust purification catalyst.

* * * * *